United States Patent

Soejima et al.

(10) Patent No.: US 8,051,835 B2
(45) Date of Patent: Nov. 8, 2011

(54) INTERNAL COMBUSTION ENGINE AND INTERNAL COMBUSTION ENGINE CONTROL METHOD

(75) Inventors: Shinichi Soejima, Gotenba (JP);
Yasuyuki Irisawa, Susono (JP);
Shinichiro Nogawa, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 366 days.

(21) Appl. No.: 12/514,320

(22) PCT Filed: Nov. 9, 2007

(86) PCT No.: PCT/IB2007/003421
§ 371 (c)(1),
(2), (4) Date: May 11, 2009

(87) PCT Pub. No.: WO2008/056242
PCT Pub. Date: May 15, 2008

(65) Prior Publication Data
US 2010/0071658 A1    Mar. 25, 2010

(30) Foreign Application Priority Data
Nov. 10, 2006    (JP) .................................. 2006-305220

(51) Int. Cl.
*F02P 5/04*    (2006.01)
*F02P 5/00*    (2006.01)
(52) U.S. Cl. ................... 123/406.45; 123/564
(58) Field of Classification Search ............. 123/406.19, 123/406.44, 406.45, 406.47, 406.52, 316, 123/559.1, 563, 564; 701/101, 103; 60/600, 60/601
See application file for complete search history.

(56) References Cited

U.S. PATENT DOCUMENTS

| | | | |
|---|---|---|---|
| 5,365,908 A | 11/1994 | Takii et al. | |
| 5,640,939 A * | 6/1997 | Shimada et al. | 123/306 |
| 5,778,856 A * | 7/1998 | Okada et al. | 123/406.47 |
| 7,010,914 B1 | 3/2006 | Roberts, Jr. et al. | |
| 2003/0195083 A1 | 10/2003 | Tabata | |
| 2003/0195084 A1 | 10/2003 | Tabata | |
| 2003/0199361 A1 | 10/2003 | Tabata | |
| 2004/0016419 A1* | 1/2004 | Satou et al. | 123/492 |
| 2005/0132705 A1 | 6/2005 | Boley et al. | |
| 2006/0069479 A1 | 3/2006 | Miyama et al. | |
| 2006/0150628 A1 | 7/2006 | Bolton et al. | |

FOREIGN PATENT DOCUMENTS

| | | |
|---|---|---|
| DE | 103 05 646 | 8/2004 |
| EP | 1 586 756 | 10/2005 |
| GB | 1 164 018 | 9/1969 |
| JP | 60 60218 | 4/1985 |
| JP | 60 138974 | 9/1985 |
| JP | 63 248973 | 10/1988 |

(Continued)

*Primary Examiner* — Mahmoud Gimie
(74) *Attorney, Agent, or Firm* — Oblon, Spivak, McClelland, Maier & Neustadt, L.L.P.

(57) ABSTRACT

In a V-type six-cylinder engine, turbo-superchargers are provided for compressing intake air and feeding the compressed air into combustion chambers, and an ECU is operable to switch the combustion mode from a non-supercharged stoichiometric combustion mode to a supercharged lean combustion mode, depending on the engine operating conditions. When switching from the non-supercharged stoichiometric combustion mode to the supercharged lean combustion mode, the ECU retards the ignition timing, and keeps the retard amount of the ignition timing at a constant value if the increasing actual boost pressure becomes equal to or higher than a pre-set target boost pressure.

11 Claims, 16 Drawing Sheets

FOREIGN PATENT DOCUMENTS

| | | |
|---|---|---|
| JP | 8 114166 | 5/1996 |
| JP | 2000 230440 | 8/2000 |
| JP | 2006 112270 | 4/2006 |
| JP | 2007 218143 | 8/2007 |

* cited by examiner

INTERNAL COMBUSTION ENGINE AND INTERNAL COMBUSTION ENGINE CONTROL METHOD

TECHNICAL FIELD

This invention relates generally to internal combustion engines capable of switching the operating state between a non-supercharged stoichiometric combustion mode and a supercharged lean combustion mode and internal combustion engine control method.

BACKGROUND ART

A general direct injection type engine is able to switch its combustion mode between a lean combustion mode in which the engine operates at a lean air/fuel ratio to achieve homogeneous combustion, and a stoichiometric combustion mode in which the engine operates at the stoichiometric air/fuel ratio to achieve homogenous combustion. In this case, a controller for the engine stores a combustion mode map used for setting the combustion mode based on the engine speed and the engine load, and controls switching between the lean combustion mode and the stoichiometric combustion mode, depending on the engine operating conditions.

When the engine capable of switching the combustion mode is controlled to change the air/fuel ratio between a lean air/fuel ratio and the stoichiometric air/fuel ratio in accordance with the operating conditions, the engine produces different amounts of torque if the air/fuel ratio is largely changed, and a large stepped change (e.g., an abrupt reduction) in torque may occur at the time of change of the air/fuel ratio, resulting in deterioration of the driveability.

In order to prevent the occurrence of a stepped change in torque at the time of change of the air/fuel ratio, it has been proposed to perform control for retarding the ignition timing. For example, when the combustion mode is switched from the stoichiometric combustion mode to the lean combustion mode, the controller controls operation of the engine at the stoichiometric air/fuel ratio during the switching control, and then changes the air/fuel ratio from the stoichiometric air/fuel ratio to a lean air/fuel ratio after the switching control. More specifically, when a command for switching from the stoichiometric combustion mode to the lean combustion mode is issued in response to the current engine operating conditions, the controller increases the throttle opening so as to increase the intake air amount, and also increases the fuel injection amount, thereby to keep the engine operating at the stoichiometric air/fuel ratio. During this operation, the controller retards the ignition timing so as to restrict or inhibit an increase of torque produced by the engine. After a lapse of a predetermined period of time, the controller advances the ignition timing so as to establish the ignition timing suitable for the engine operating conditions, and reduces the fuel injection amount so as to change the air/fuel ratio from the stoichiometric ratio to a lean air/fuel ratio. An example of the internal combustion engine controlled in this manner is disclosed in Japanese Patent Application Publication No. 08-114166 (JP-A-08-114166).

In the case where the engine is equipped with a turbo-supercharger or turbocharger, however, the boost pressure rises to a level higher than necessary due to an increase of exhaust energy when the combustion mode is switched between a non-supercharged stoichiometric combustion mode and a supercharged lean combustion mode, and a stepped change (e.g., an abrupt reduction) in torque occurs when the control for changing the air/fuel ratio is finished, resulting in deterioration of the driveability. More specifically, when the combustion mode of the engine switches from the non-supercharged stoichiometric combustion mode to the supercharged lean combustion mode, the exhaust gas temperature rises due to retardation of the ignition timing, and the actual boost pressure produced by the turbo-supercharger rises to a level equal to or higher than a target boost pressure. As the boost pressure increases more than necessary, the torque increases, and a stepped change (e.g., an abrupt reduction) in torque occurs since it is necessary to reduce the increased torque when the control for changing the air/fuel ratio is finished. In this case, as the engine load (or the intake air amount) increases, the amount of reduction of torque relative to the retard amount of the ignition timing increases, and therefore, an apparently large stepped change in torque occurs at the time of switching of the combustion mode, resulting in deterioration of the combustion mode.

DISCLOSURE OF INVENTION

It is an object of the invention to provide an internal combustion engine capable of preventing the occurrence of a stepped change in torque at the time of change of the air/fuel ratio, thus assuring improved driveability.

A first aspect of the invention is concerned with an internal combustion engine including a supercharger capable of compressing intake air and feeding the compressed intake air into a combustion chamber, boost pressure detecting means for detecting the boost pressure, air/fuel ratio changing means for changing the air/fuel ratio, ignition timing changing means for changing the ignition timing, and control means for causing the ignition timing changing means to retard the ignition timing when the air/fuel ratio changing means changes the air/fuel ratio from the stoichiometric air/fuel ratio to a lean air/fuel ratio. According to the first aspect of the invention, when the control means changes the air/fuel ratio from the stoichiometric air/fuel ratio to the lean air/fuel ratio while retarding the ignition timing, the control means keeps the retard amount of the ignition timing at a constant value if the boost pressure detected by the boost pressure detecting means becomes equal to or higher than a target boost pressure that is set in advance depending on operating conditions of the engine.

In the internal combustion engine according to the first aspect of the invention, when the control means changes the air/fuel ratio from the stoichiometric air/fuel ratio to a lean air/fuel ratio while retarding the ignition timing, the control means keeps the retard amount of the ignition timing at a constant value if the boost pressure becomes equal to or higher than the target boost pressure that is set in advance depending on the engine operating conditions. It is therefore possible to prevent the boost pressure from increasing to a level higher than necessary, and thus prevent the occurrence of a stepped change (e.g., an abrupt reduction) in torque at the time of change of the air/fuel ratio, thus assuring improved driveability.

In the internal combustion engine according to the first aspect of the invention, the target boost pressure may be set to a value that is lower by a predetermined amount than a required boost pressure that is set based on the operating conditions of the engine so that the boost pressure reaches the required boost pressure when the lean air/fuel ratio is established.

In the internal combustion engine as described above, air amount detecting means may be further provided for detecting the amount of air drawn into the combustion chamber. In this case, when the control means changes the air/fuel ratio from the stoichiometric air/fuel ratio to a lean air/fuel ratio while retarding the ignition timing, the control means may keep the retard amount of the ignition timing at a constant value if the boost pressure becomes equal to or higher than the target boost pressure, and may control the throttle opening so that the air amount detected by the air amount detecting means becomes substantially equal to a target air amount that is set in advance depending on the operating conditions of the engine.

A second aspect of the invention is concerned with an internal combustion engine including a supercharger capable of compressing intake air and feeding the compressed intake air into a combustion chamber, an exhaust escape valve disposed in a bypass passage that bypasses a turbine of the supercharger, boost pressure detecting means for detecting the boost pressure, air/fuel ratio changing means for changing the air/fuel ratio, ignition timing changing means for changing the ignition timing, and control means for causing the ignition timing changing means to retard the ignition timing when the air/fuel ratio changing means changes the air/fuel ratio between a lean air/fuel ratio and a stoichiometric air/fuel ratio. According to the second aspect of the invention, when the control means changes the air/fuel ratio from the lean air/fuel ratio to the stoichiometric air/fuel ratio while retarding the ignition timing, the control means increases the degree of opening of the exhaust escape valve in accordance with the amount of increase of exhaust energy during control for changing the air/fuel ratio.

In the internal combustion engine according to the second aspect of the invention, when the control means changes the air/fuel ratio from the stoichiometric air/fuel ratio to the lean air/fuel ratio while retarding the ignition timing, the control means may increase the degree of opening of the exhaust escape valve in accordance with the amount of increase of exhaust energy if the boost pressure detected by the boost pressure detecting means becomes equal to or higher than a target boost pressure that is set in advance depending on operating conditions of the engine.

In the internal combustion engine as described above, when the control means changes the air/fuel ratio from the stoichiometric air/fuel ratio to the lean air/fuel ratio while retarding the ignition timing, the control means increases the degree of opening of the exhaust escape valve in accordance with the amount of increase of the exhaust energy if the boost pressure becomes equal to or higher than the target boost pressure that is set in advance depending on the engine operating conditions. Also, when the control means changes the air/fuel ratio from a lean air/fuel ratio to the stoichiometric air/fuel ratio while retarding the ignition timing, the control means increases the degree of opening of the exhaust escape valve in accordance with the amount of increase of the exhaust energy during the control for changing the air/fuel ratio. With the engine thus controlled, part of the exhaust gas is discharged through the bypass passage in which the exhaust escape valve is opened, without passing the turbine of the supercharger. It is thus possible to prevent the boost pressure from increasing to a level higher than necessary, and prevent the occurrence of a stepped change (e.g., an abrupt reduction) in torque at the time of change of the air/fuel ratio, thus assuring improved driveability.

In the internal combustion engine as described above, the control means may calculate the amount of increase of exhaust energy based on the amount of increase of the exhaust gas temperature during the control for changing the air/fuel ratio, and may set the degree of opening of the exhaust escape valve based on the amount of increase of exhaust energy and the amount of flow of exhaust gas.

A third aspect of the invention is concerned with an internal combustion engine including a supercharger capable of compressing intake air and feeding the compressed intake air into a combustion chamber, an intake-air escape valve disposed in a return passage through which the air compressed by the supercharger is fed back to an intake passage upstream of a compressor of the supercharger, boost pressure detecting means for detecting the boost pressure, air/fuel ratio changing means for changing the air/fuel ratio, ignition timing changing means for changing the ignition timing, and control means for causing the ignition timing changing means to retard the ignition timing when the air/fuel ratio changing means changes the air/fuel ratio between a lean air/fuel ratio and a stoichiometric air/fuel ratio. According to the third aspect of the invention, when the control means changes the air/fuel ratio from the lean air/fuel ratio to the stoichiometric air/fuel ratio while retarding the ignition timing, the control means increases the degree of opening of the intake-air escape valve in accordance with the amount of increase of the boost pressure during control for changing the air/fuel ratio.

In the internal combustion engine according to the third aspect of the invention, when the control means changes the air/fuel ratio from the stoichiometric air/fuel ratio to the lean air/fuel ratio while retarding the ignition timing, the control means may increase the degree of opening of the intake-air escape valve in accordance with the amount of increase of the boost pressure if the boost pressure detected by the boost pressure detecting means becomes equal to or higher than a target boost pressure that is set in advance depending on operating conditions of the engine.

In the internal combustion engine as described above, when the control means changes the air/fuel ratio from the stoichiometric air/fuel ratio to a lean air/fuel ratio while retarding the ignition timing, the control means increases the degree of opening of the intake-air escape valve in accordance with the amount of increase of the boost pressure when the boost pressure becomes equal to or higher than the target boost pressure that is set in advance depending on the engine operating conditions. Also, when the control means changes the air/fuel ratio from a lean air/fuel ratio to the stoichiometric air/fuel ratio while retarding the ignition timing, the control means increases the degree of opening of the intake-air escape valve in accordance with the amount of increase of the boost pressure during the control for changing the air/fuel ratio. With the engine thus controlled, part of the compressed intake air is fed back to a portion of the intake passage upstream of the compressor of the supercharger through the intake-air escape valve. It is thus possible to prevent the boost pressure from increasing to a level higher than necessary, and prevent the occurrence of a stepped change (e.g., an abrupt reduction) in torque at the time of change of the air/fuel ratio, thus assuring improved driveability.

A fourth aspect of the invention is concerned with an internal combustion engine including a plurality of cylinders that are divided into first and second cylinder groups that are arranged in left and right banks, respectively, first and second exhaust passages provided independently for the first and second cylinder groups, first and second control valves disposed in the first and second exhaust passages, respectively, for controlling the amount of flow of exhaust gas in the corresponding exhaust passages, first and second purifying catalysts disposed in the first and second exhaust passages, respectively, a communication passage through which a portion of the first exhaust passage upstream of the first control valve and the first purifying catalyst communicates with a portion of the second exhaust passage upstream of the second control valve and the second purifying catalyst, a supercharger provided only for the first cylinder group, air/fuel ratio changing means for changing the air/fuel ratio, ignition timing changing means for changing the ignition timing, and control means for causing the ignition timing changing means to retard the ignition timing when the air/fuel ratio changing means changes the air/fuel ratio between a lean air/fuel ratio and a stoichiometric air/fuel ratio. According to the fourth aspect of the invention, when the control means changes the air/fuel ratio from the lean air/fuel ratio to the stoichiometric air/fuel ratio while retarding the ignition timing, the control means closes the first control valve and opens the second control valve during control for changing the air/fuel ratio.

In the internal combustion engine according to the fourth aspect of the invention, when the control means changes the air/fuel ratio from a lean air/fuel ratio to the stoichiometric air/fuel ratio while retarding the ignition timing, the control means closes the first control valve disposed in the first exhaust passage connected to the first cylinder group provided with the supercharger, and opens the second control valve disposed in the second exhaust passage connected to the second cylinder group having no supercharger, so that the exhaust gas is discharged through the second exhaust passage in which no turbine is provided. It is thus possible to prevent the boost pressure from increasing to a level higher than necessary, and prevent the occurrence of a stepped change (e.g., an abrupt reduction) in torque at the time of change of the air/fuel ratio, thus assuring improved driveability.

In the internal combustion engine according to the fourth aspect of the invention, when the control means changes the air/fuel ratio from the stoichiometric air/fuel ratio to the lean air/fuel ratio while retarding the ignition timing during start-up of the engine with the purifying catalysts warmed up, the control means may open the first control valve and close the second control valve during the control for changing the air/fuel ratio.

In the internal combustion engine according to the fourth aspect of the invention, the control means may cause the air/fuel ratio changing means to change the air/fuel ratio from the lean air/fuel ratio to the stoichiometric air/fuel ratio, after a lapse of a predetermined time from opening or closing of the first control valve and the second control valve.

BRIEF DESCRIPTION OF DRAWINGS

The foregoing and further objects, features and advantages of the invention will become apparent from the following description of exemplary embodiments with reference to the accompanying drawings, wherein like numerals are used to represent like elements and wherein.

MODES FOR CARRYING OUT THE INVENTION

Some embodiments of internal combustion engines of the invention will be described in detail with reference to the accompanying drawings. It is, however, to be understood that the invention is not limited to the details of the embodiments.

Figure 1:
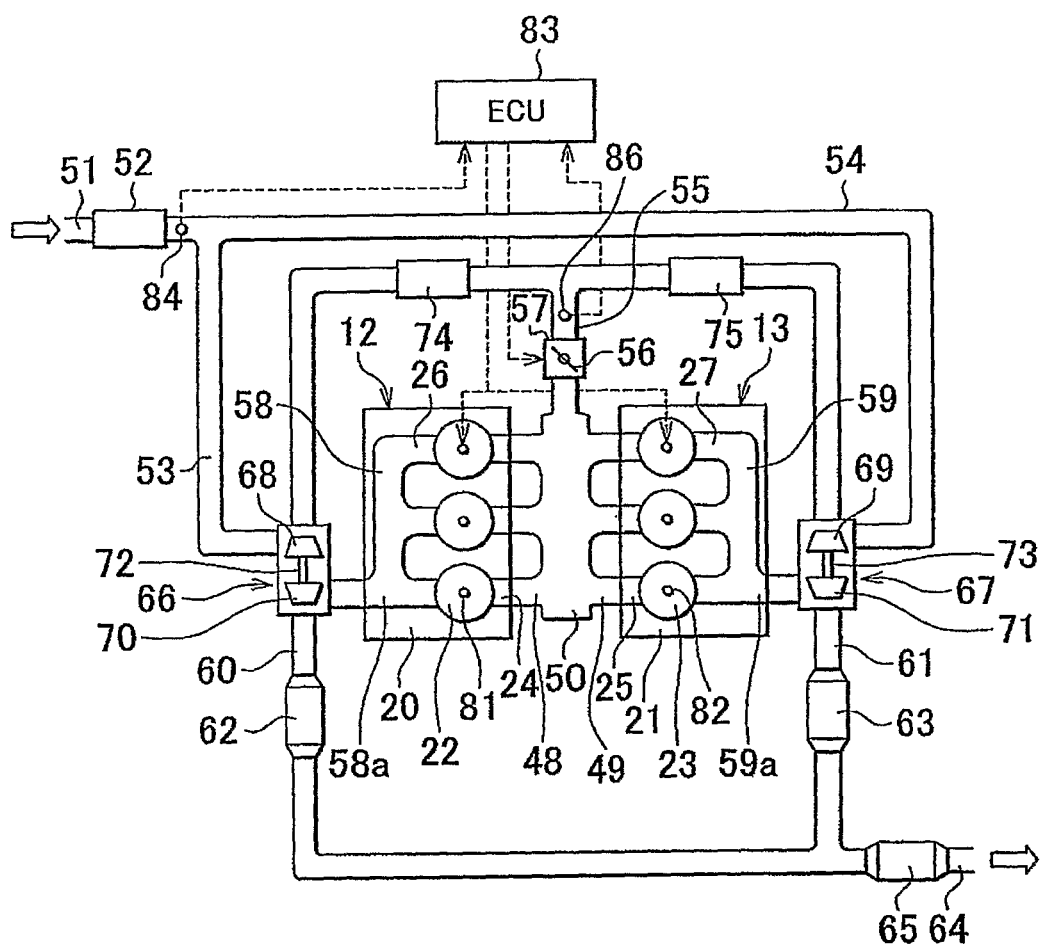
FIG. 1 is a schematic plan view of a V-type six-cylinder engine as an internal combustion engine according to a first embodiment of the invention.
Figure 2:
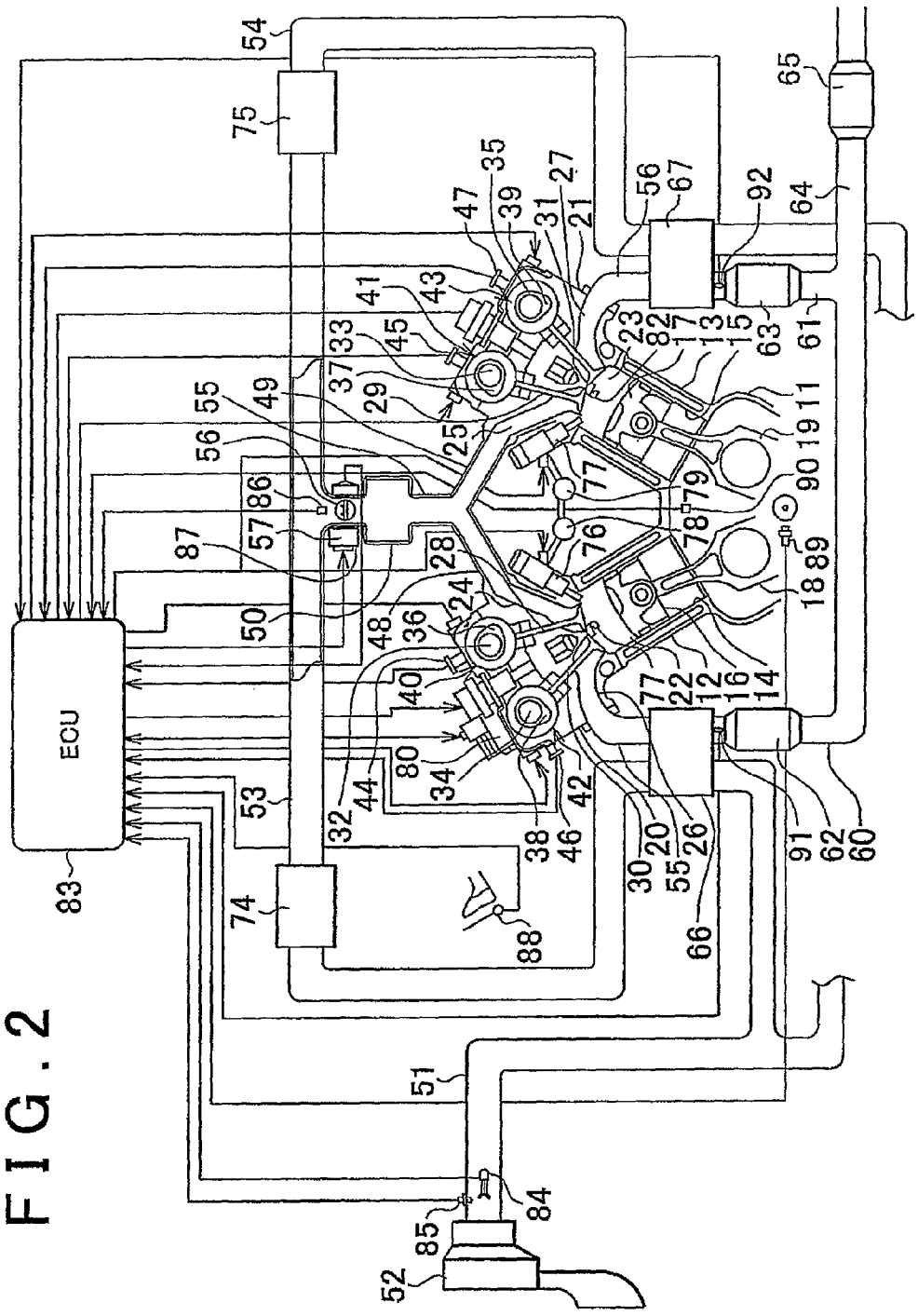
FIG. 2 is a schematic cross-sectional view of the V-type six-cylinder engine of the first embodiment.
Figure 3:
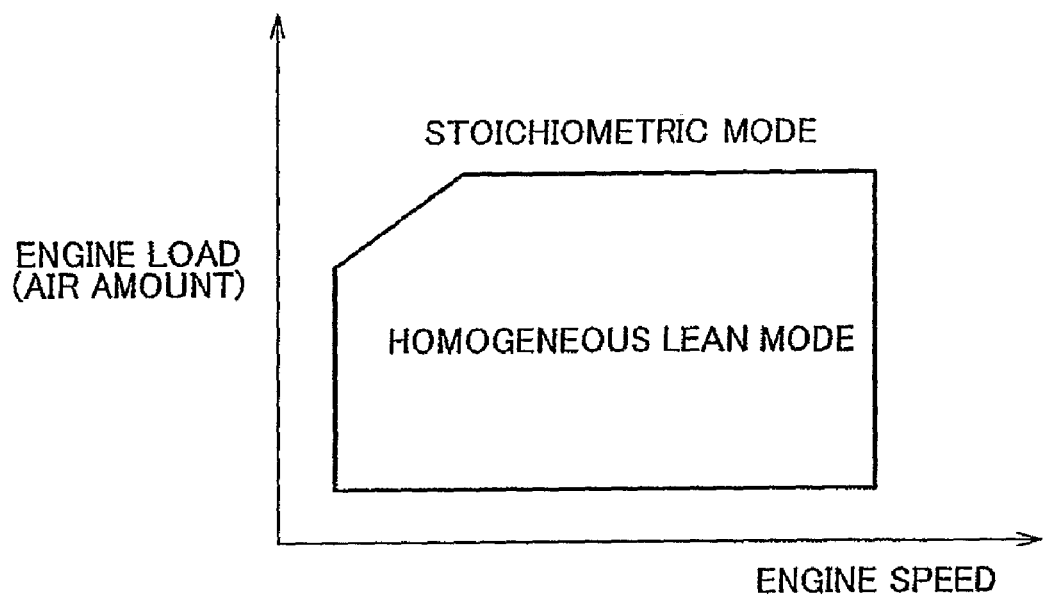
FIG. 3 is a combustion mode map indicating the combustion modes of the V-type six-cylinder engine of the first embodiment.
Figure 4:
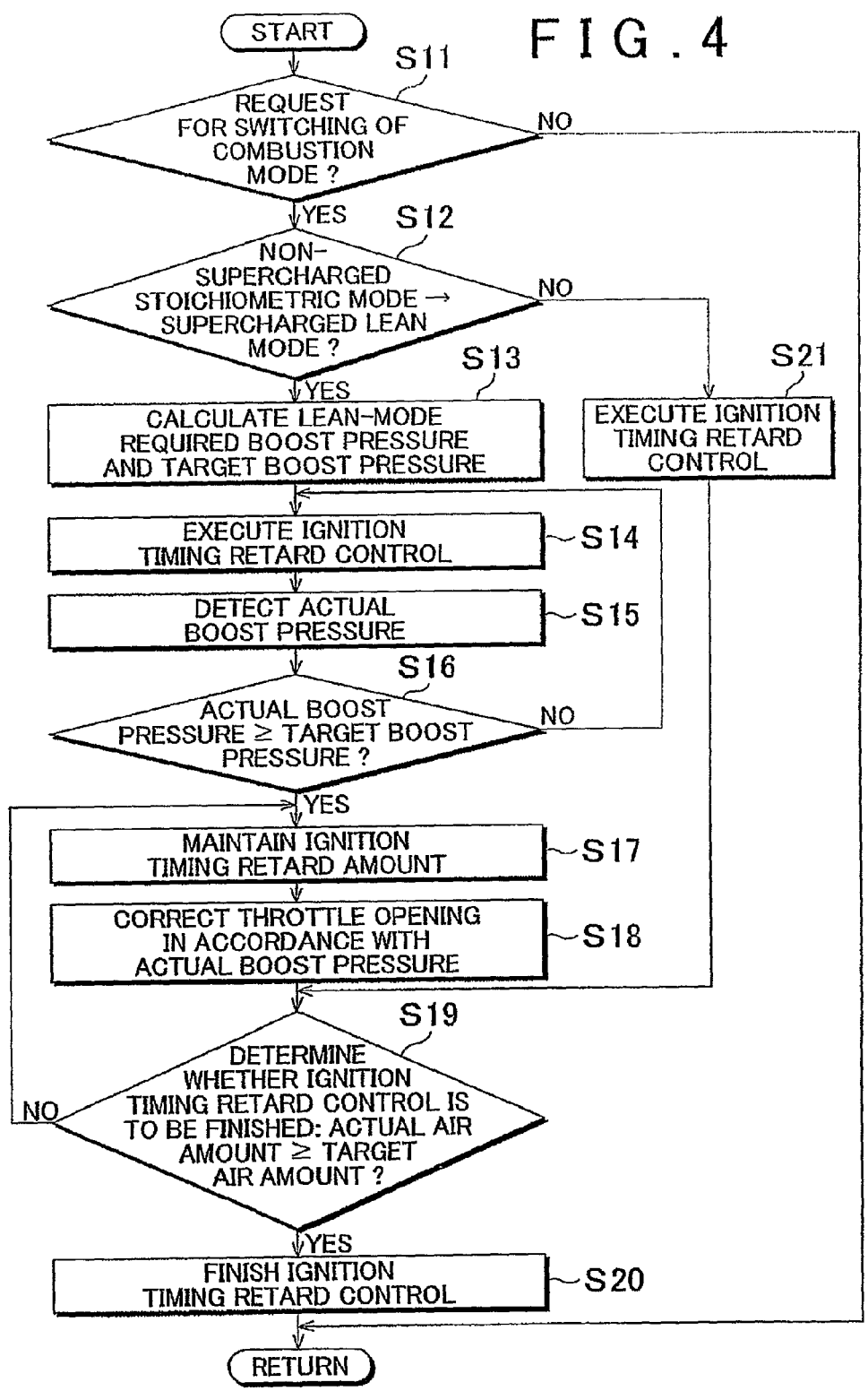
FIG. 4 is a flowchart illustrating a routine of combustion mode switching control performed on the V-type six-cylinder engine of the first embodiment.
Figure 5:
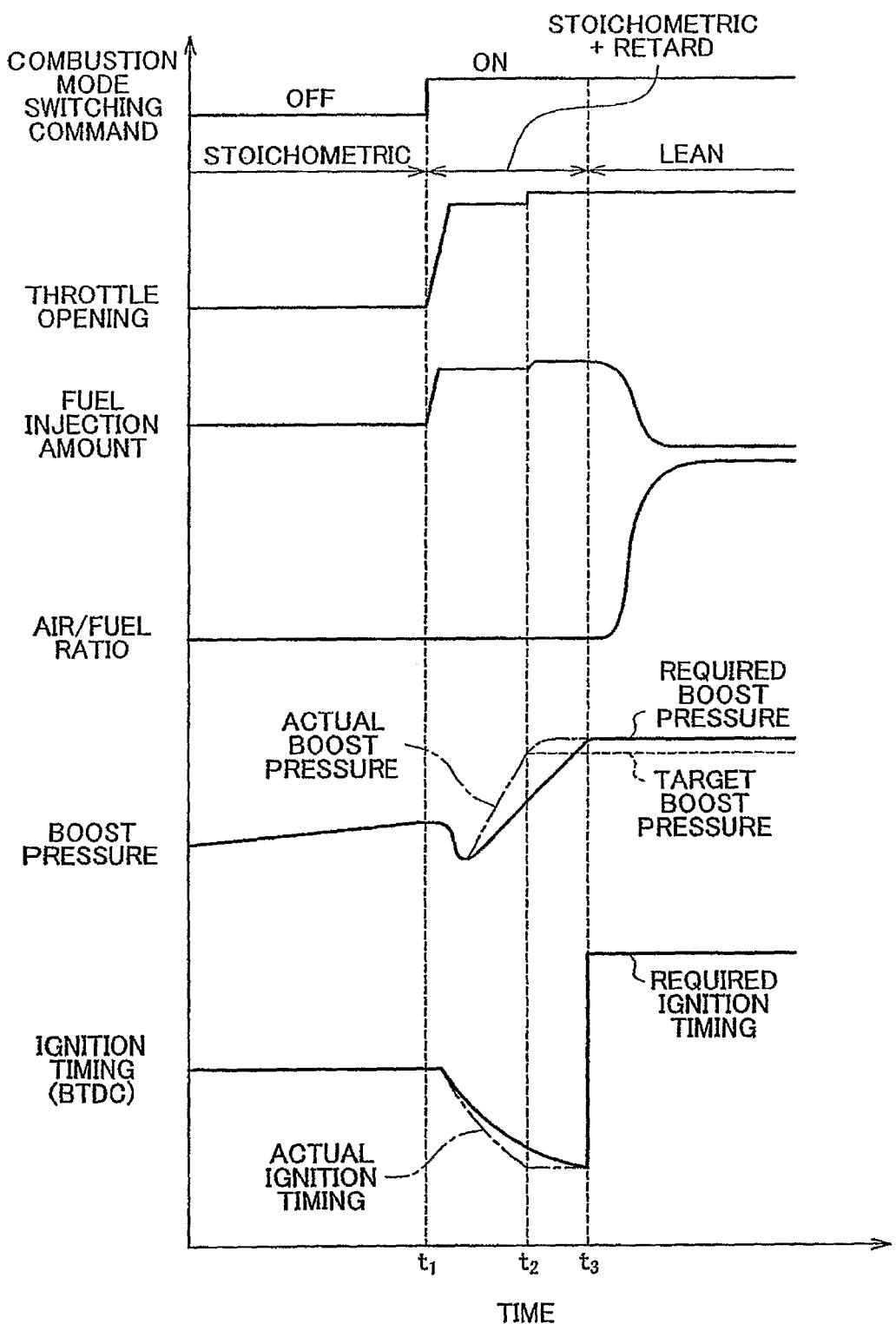
FIG. 5 is a time chart showing transitions in the engine operating conditions during switching of the combustion mode in the V-type six-cylinder engine of the first embodiment.

FIG. 1 is a schematic plan view of a V-type six-cylinder engine as an internal combustion engine according to a first embodiment of the invention. FIG. 2 is a schematic cross-sectional view of the V-type six-cylinder engine of the first embodiment, and FIG. 3 is a combustion mode map showing combustion modes in which the V-type six-cylinder engine of the first embodiment is operable. FIG. 4 is a flowchart illustrating a routine of combustion mode switching control performed on the V-type six-cylinder engine of the first embodiment, and FIG. 5 is a time chart showing transitions in engine operating conditions during switching of the combustion mode in the V-type six-cylinder engine of the first embodiment.

The internal combustion engine of the present embodiment is in the form of a V-type six-cylinder engine. In the V-type six-cylinder engine, a cylinder block 11 has left and right banks 12, 13 located in its upper portion such that each of the banks 12, 13 is inclined a certain angle relative to the vertical direction of the engine, and a plurality of cylinders are disposed in each of the banks 12, 13 so as to provide two cylinder groups for the two banks 12, 13, as shown in FIG. 1 and FIG. 2. Three cylinder bores 14, 15 are formed in each of the banks 12, 13, and a piston 16, 17 is received in oath of the cylinder bores 14, 15 such that the piston 16, 17 can move up and down in the corresponding cylinder bore 14, 15. A crankshaft (not shown) is rotatably supported in a lower portion of the cylinder block 11, and the pistons 16, 17 are respectively connected to the crankshaft via connecting rods 18, 19.

On the other hand, cylinder heads 20, 21 are fastened onto the tops of the respective banks 12, 13 of the cylinder block 11, and the cylinder block 11, pistons 16, 17 and the cylinder heads 20, 21 cooperate to define combustion chambers 22, 23. Intake ports 24, 25 and exhaust ports 26, 27 are formed above the combustion chambers 22, 23, namely, at the lower faces of the cylinder heads 20, 21, such that the intake ports 24, 25 are opposed to the exhaust ports 26, 27, and the lower end portions of intake valves 28, 29 and exhaust valves 30, 31 are located in the intake ports 24, 25 and exhaust ports 26, 27, respectively. The intake valves 28, 29 and the exhaust valves 30, 31 are axially movably supported by the cylinder heads 20, 21, and are biased in such a direction as to close the intake ports 24, 25 and the exhaust ports 26, 27, respectively. Intake camshafts 32, 33 and exhaust camshafts 34, 36 are rotatably supported by the cylinder heads 20, 21, and intake cams 36, 37 and exhaust cams 38, 39 formed on the intake camshafts 32, 33 and exhaust camshafts 34, 35 are in contact with the upper end portions of the intake valves 28, 29 and exhaust valves 30, 31, respectively, via roller rocker arms (not shown).

With the above arrangement, when the intake camshafts 32, 33 and exhaust camshafts 34, 35 rotate in synchronization with the engine, the intake cams 36, 37 and exhaust cams 38, 39 actuate the corresponding roller rocker arms so as to move the intake valves 28, 29 and exhaust valves 30, 31 in the axial directions thereof in certain timing, thereby to open and close the intake ports 24, 25 and exhaust ports 26, 27. When the intake valves 28, 29 or the exhaust valves 30, 31 are moved down to open the intake ports 24, 25 or the exhaust ports, 26, 27, the intake ports 24, 25 and the combustion chambers 22, 23, or the combustion chambers 22, 23 and the exhaust ports 26, 27, can be brought into communication with each other.

The engine of this embodiment further includes a valve actuating system that consists of variable intake-valve timing mechanisms (VVT: Variable Valve Timing-intelligent) 40, 41 and variable exhaust-valve timing mechanisms 42, 43, which control the intake valves 28, 29 and the exhaust valves 30, 31, respectively, to the optimum open/close timing in accordance with the engine operating conditions. For example, VVT controllers are mounted at axial end portions of the intake camshafts 32, 33 and exhaust camshafts 34, 35 so as to provide the variable intake-valve timing mechanisms 40, 41 and the variable exhaust-valve timing mechanisms 42, 43, respectively. The VVT controller operates to change the phase of each of the camshafts 32, 33, 34, 35 relative to a corresponding cam sprocket by means of a hydraulic pump (or an electric motor), so as to advance or retard the open/close time of the corresponding ones of the intake valves 28, 29 and exhaust valves 30, 31. In this case, each of the variable valve timing mechanisms 40, 41, 42 43 advances or retards the open/close time of the corresponding intake valves 28, 29 or exhaust valves 30, 31 while keeping the operation angle (or open period) of the intake valves 28, 29 or exhaust valves 30, 31 constant. The intake camshafts 32, 33 and exhaust camshafts 34, 35 are respectively provided with cam position sensors 44, 45, 46, 47 for detecting the phase of rotation thereof.

A surge tank 50 is connected to the intake ports 24, 25 of the respective cylinder heads 20, 21 via intake manifolds 48, 49. An air cleaner 52 is mounted at an air inlet of an intake pipe (intake passage) 51, and the intake pipe 51 is divided into two intake branch pipes 53, 54. These intake branch pipes 53, 54 join together at their downstream end portions, into an intake collection pipe 55 that is connected to the surge tank 50. An electronic throttle device 57 having a throttle valve 56 is disposed in the intake collection pipe 55.

The exhaust ports 26, 27 communicate with collection passages 58, 59 into which exhaust gases emitted from the respective combustion chambers 22, 23 are collected, and first and second exhaust pipes 60, 61 are connected to the collection passages 58, 59 via exhaust-pipe connecting portions 58a, 59a, respectively. In this case, the exhaust ports 26, 27, collection passage 58, 59 and the exhaust-pipe connecting portion 58a, 59a are integrally formed in each of the cylinder heads 20, 21 of the left and right banks 12, 13.

A first upstream three-way catalyst (purifying catalyst) 62 is mounted in the first exhaust pipe 60, while a second upstream three-way catalyst (purifying catalyst) 63 is mounted in the second exhaust pipe 61. The first and second exhaust pipes 60, 61 are joined together at their downstream ends, to be connected to an exhaust collection pipe 64, and a NOx storage-reduction type catalyst 65 is mounted in the exhaust collection pipe 64. When the air/fuel ratio of the exhaust gas is equal to the stoichiometric air/fuel ratio, each of the upstream three-way catalysts 62, 63 converts HC, CO, NOx contained in the exhaust gas into harmless substances at the same time, through oxidation and reduction. The NOx storage-reduction type catalyst 65 once adsorbs and stores NOx contained in the exhaust gas when the exhaust air/fuel ratio is lean, and releases the stored NOx when the engine is operated in a rich combustion region or stoichiometric combustion region in which the concentration of oxygen in the exhaust gas is reduced, so that the released NOx is reduced by fuel added as a reducing agent.

The first and second banks 12, 13 are respectively provided with turbo-superchargers (hereinafter simply referred to as "turbochargers") 66, 67. Each of the turbochargers 66, 67 consists principally of a compressor 68, 69 disposed in the corresponding intake branch pipe 53, 54, a turbine 70, 71 disposed in the corresponding exhaust pipe 60, 61, and a coupling shaft 72, 73 that integrally couples the compressor 68, 69 with the turbine 70, 71. In this case, the turbine 70, 71 of each of the turbochargers 66, 67 can be driven by the exhaust gas flowing through the corresponding one of the exhaust pipes 60, 61 of the first and second banks 12, 13. In the intake branch pipes 53, 54 downstream of the compressors 68, 69 of the turbochargers 66, 67, intercoolers 74, 75 are respectively provided for cooling intake air whose temperature was raised when compressed by the compressors 68, 69.

The turbochargers 66, 67 provided in the first and second banks 12, 13 and constructed as described above can compress air flowing in the intake branch pipes 53, 54, by causing the exhaust gas discharged from the respective combustion chambers 22, 23 into the exhaust pipes 60, 61 via the exhaust ports 26, 27 and collection passages 58, 59 to drive the turbines 70, 71, and causing the turbines 70, 71 to drive the compressors 68, 69 coupled to the turbines 70, 71 with the coupling shafts 72, 73. Thus, air introduced into the intake pipe 51 through the air cleaner 52 is fed to the surge tank 50 after compressed by the turbochargers 66, 67 and cooled by the intercoolers 74, 75, and is then drawn by suction into the combustion chambers 22, 23 via the intake manifolds 48, 49 and intake ports 24, 25 of the respective banks 12, 13.

Injectors 76, 77 for injecting fuel (gasoline) directly into the respective combustion chambers 22, 23 are mounted in the cylinder heads 20, 21, and delivery pipes 78, 79 are connected to the respective injectors 76, 77. In operation, fuel having a suitable pressure can be supplied from a high-pressure fuel pump 80 to the respective delivery pipes 78, 79, to be fed to the corresponding injectors 76, 77. Also, ignition plugs 81, 82 for firing fuel-air mixtures are mounted in the cylinder heads 20, 21 such that each of the ignition plugs 81, 82 is located at the top of the corresponding combustion chamber 22, 23.

An electronic control unit (ECU) 83 is installed on the vehicle. The ECU 83 is capable of controlling the fuel injection timing of the injectors 76, 77 and the ignition timing of the ignition plugs 81, 82, and determines the fuel injection amount, the injection timing, the ignition timing, and so forth, based on engine operating conditions including, for example, the detected intake air amount, intake air temperature, boost pressure, throttle opening, accelerator pedal position, engine speed and the coolant temperature. More specifically, an air flow meter 84 and an intake air temperature sensor 85 mounted in an upstream portion of the intake pipe 51 measure the intake air amount and the intake air temperature, respectively, and transmit the measured intake air amount and intake air temperature to the ECU 83. Also, a boost pressure sensor 86 mounted in the intake collection pipe 55 measures the boost pressure, and transmits the measured boost pressure to the ECU 83. A throttle position sensor 87 provided in the electronic throttle device 57 and an accelerator position sensor 88 provided in the accelerator pedal detect the current throttle opening and the current accelerator pedal position, respectively, and transmit the detected throttle opening and accelerator pedal position to the ECU 83. Furthermore, a crank angle sensor 89 provided at the crankshaft detects the crank angle, and transmits the detected crank angle to the ECU 83, which in turn calculates the engine speed based on the crank angle. Also, a water temperature sensor 90 provided in the cylinder block 11 detects the engine coolant temperature, and transmits the detected coolant temperature to the ECU 83.

Also, A/F sensors 91, 92 are disposed upstream of the respective upstream three-way catalysts 62, 63 in the exhaust pipes 60, 61. Each of the A/F sensors 91, 92 detects the exhaust air/fuel ratio of the exhaust gas emitted from the combustion chambers 22, 23 to the corresponding exhaust pipe 60, 61 through the exhaust ports 26, 27, and transmits the detected exhaust air/fuel ratio to the ECU 83 for feedback control. The ECU 83 compares the exhaust air/fuel ratio detected by the A/F sensor 91, 92 with a target air/fuel ratio that is set in accordance with the engine operating conditions, thereby to correct the fuel injection amount.

The ECU 83 is also capable of controlling the variable intake-valve timing mechanisms 40, 41 and the variable exhaust-valve timing mechanisms 42, 43 based on the engine operating conditions. More specifically, when the engine operates at low temperatures or at a light load, or when the engine starts or idles, the ECU 83 controls the variable valve timing mechanisms 40, 41, 42, 43 to eliminate an overlap between the open period of the exhaust valves 30, 31 and the open period of the intake valves 28, 29, so as to reduce the amount of exhaust gas that blows back into the intake ports 24, 25 or the combustion chambers 22, 23, and thus achieve stable combustion and improved fuel economy. When the engine operates at a middle load, the ECU 83 controls the variable valve timing mechanisms 40, 41, 42, 43 to increase the above-mentioned overlap, so as to increase the internal EGR rate for improved exhaust gas purification efficiency and reduce pumping losses for improved fuel economy. When the engine runs at a low to middle speed with a high load, the ECU 83 controls the variable intake-valve timing mechanisms 40, 41 to advance the time at which the intake valves 28, 29 are closed, so as to reduce the amount of intake air that blows back to the intake ports 24, 25 for improved volumetric efficiency. When the engine runs at a high speed with a high load, the ECU 83 controls the variable intake-valve timing mechanisms 40, 41 to retard the time at which the intake valves 28, 29 are closed in accordance with the engine speed, so as to provide open/close timing that matches the inertial force of the intake air and thus improve the volumetric efficiency.

In the V-type six-cylinder engine of the present embodiment, the ECU 83 is able to switch the combustion mode between a lean combustion mode in which homogeneous charge combustion can be effected at a lean air/fuel ratio, and a stoichiometric combustion mode in which homogeneous charge combustion can be effected at the stoichiometric air/fuel ratio, depending upon the engine operating conditions. In this case, the ECU 83 has a combustion mode map used for determining the combustion mode based on the engine speed and the engine load (air amount), as shown in FIG. 3, and controls switching between the lean combustion mode and the stoichiometric combustion mode, using the combustion mode map.

When the ECU 83 controls switching between the lean combustion mode and the stoichiometric combustion mode, using the combustion mode map, the engine is operated at the stoichiometric air/fuel ratio during the switching control, and the air/fuel ratio is changed as needed after the switching control. Namely, when the combustion mode is switched from the stoichiometric combustion mode to the lean combustion mode, the ECU 83 maintains the stoichiometric air/fuel ratio by changing the throttle opening and also changing the fuel injection amount, while retarding the ignition timing so as to restrict or avoid an increase of torque produced by the engine. After a lapse of a predetermined period and the completion of the switching control, the ECU 83 advances the ignition timing to the timing suitable for the engine operating conditions, and changes the fuel injection amount so as to change the air/fuel ratio from the stoichiometric air/fuel ratio to a lean air/fuel ratio.

In the case where the engine is equipped with turbochargers as in the first embodiment, however, the following problem may occur upon switching of the combustion mode. Namely, when the combustion mode is switched between a non-supercharged stoichiometric combustion mode and a supercharged lean combustion mode, the boost pressure increases to a level higher than necessary due to an increase of the exhaust energy, and a stepped change (e.g., an abrupt reduction) in torque occurs upon the completion of the combustion mode switching control, resulting in deterioration of the driveability.

In the engine of the first embodiment, therefore, when the ECU 83 changes the combustion mode (the air/fuel ratio) from the non-supercharged stoichiometric combustion mode (the stoichiometric air/fuel ratio) to the supercharged lean combustion mode (a lean air/fuel ratio) while retarding the ignition timing, the ECU 83 keeps the retard amount of the ignition timing at a constant value if the boost pressure detected by the boost pressure sensor 86 becomes equal to or higher than a target boost pressure that is set in advance depending on the engine operating conditions. In the present embodiment, the boost pressure sensor 86 provides the above-mentioned boost pressure detecting means for detecting the boost pressure, and the ECU 83 provides the air/fuel ratio changing means for changing the air/fuel ratio, ignition timing changing means for changing the ignition timing, and the control means that causes the ignition timing changing means to retard the ignition timing when the air/fuel ratio changing means changes the air/fuel ratio from the stoichiometric air/fuel ratio to a lean air/fuel ratio.

In this case, the ECU 83 sets the target boost pressure depending on the engine operating conditions, more specifically, sets the target boost pressure to be lower by a predetermined amount than the required boost pressure that is set based on the engine operating conditions (e.g., the accelerator pedal position).

When the ECU 83 changes the combustion mode (the air/fuel ratio) from the non-supercharged stoichiometric combustion mode (the stoichiometric air/fuel ratio) to the supercharged lean combustion mode (a lean air/fuel ratio) while retarding the ignition timing, the ECU 83 keeps the retard amount of the ignition timing at a constant value if the boost pressure becomes equal to or higher than the target boost pressure, and adjusts the throttle opening of the throttle valve 56 of the electronic throttle device 57 so that the intake air amount detected by the air flow sensor 84 becomes equal to a target air amount that is set in advance depending upon the engine operating conditions. In the present embodiment, the air flow sensor 84 provides the above-mentioned air amount detecting means for detecting the amount of air drawn into the combustion chambers 22, 23. In this case, the ECU 83 sets the target air amount based on the engine operating conditions (e.g., the accelerator pedal position).

In the following, the combustion mode switching control performed on the V-type six-cylinder engine of the present embodiment as described above will be more specifically explained with reference to the flowchart of FIG. 4.

In the V-type six-cylinder engine of the present embodiment, the ECU 83 determines in step S11 whether a command as a request for switching of the combustion mode has been issued, based on the engine operating conditions, and finishes one cycle of this routine without executing any further steps if the ECU 83 determines that there is no command or request for switching of the combustion mode, as shown in FIG. 4. If the ECU 83 determines that a command as a request for switching of the combustion mode has been issued, the ECU 83 determines in step S12 whether the request for switching of the combustion mode is a request for switching from the non-supercharged stoichiometric combustion mode to the supercharged lean combustion mode. If it is determined that the request currently issued is not that for switching from the non-supercharged stoichiometric combustion mode to the supercharged lean combustion mode, the ECU 83 executes normal ignition timing retard control in step S21.

If, on the other hand, the ECU 83 determines in step S12 that the switching request is that for switching from the non-supercharged stoichiometric combustion mode to the supercharged lean combustion mode, step S13 is executed to calculate a lean-mode required boost pressure based on the accelerator pedal position detected by the accelerator position sensor 88, and calculate a lean-mode target boost pressure by subtracting a predetermined value from the lean-mode required boost pressure. The ECU 83 then proceeds to step S14 to execute ignition timing retard control.

Subsequently, the ECU 83 retrieves the boost pressure (actual boost pressure) detected by the boost pressure sensor 86 in step S15, and determines in step S16 whether the actual boost pressure has become equal to or higher than the target boost pressure. When the combustion mode is switched from the non-supercharged stoichiometric combustion mode to the supercharged lean combustion mode, the intake air amount and the fuel injection amount are increased so as to maintain the stoichiometric air/fuel ratio during the switching control, and therefore, the amount of exhaust gas increases, resulting in a rise in the boost pressure. On the other hand, the ignition timing is retarded so as to restrict or avoid an increase of torque. Thus, the ECU 83 checks if the boost pressure has increased to a level higher than necessary by determining in step S16 whether the actual boost pressure has increased to be equal to or higher than the target boost pressure during switching control of the combustion mode.

If it is determined in step S16 that the actual boost pressure has not become equal to or higher than the target boost pressure during switching control of the combustion mode, steps S13 through S15 are repeatedly executed. If it is determined in step S16 that the actual boost pressure has become equal to or higher than the target boost pressure, the ECU 83 stops further retarding the ignition timing and maintains the current retard amount in step S17. Thereafter, the ECU 83 corrects the throttle opening in accordance with the actual boost pressure in step S18, and determines whether the ignition timing retard control is to be finished in step S19 by determining whether the actual intake air amount has become equal to or larger than a target intake air amount. Since the actual boost pressure does not reach the required boost pressure even if the actual boost pressure becomes equal to or higher than the target boost pressure during the switching control of the combustion mode, the accelerator pedal position is largely corrected so that the actual intake air amount becomes equal to the target intake air amount.

If it is determined in step S19 that the actual intake air amount has not become equal to or larger than the target intake air amount, steps S17 and S18 are repeatedly executed. If it is determined in step S19 that the actual intake air amount has become equal to or larger than the target intake air amount, step S20 is executed to finish the ignition timing retard control.

In the following, transitions in the engine operating conditions due to the combustion mode switching control performed on the V-type six-cylinder engine of the present embodiment will be specifically explained with reference to the time chart of FIG. 5.

In the V-type six-cylinder engine of the present embodiment, if a request for switching from the non-supercharged stoichiometric combustion mode to the supercharged lean combustion mode is made at time t1, as shown in FIG. 5, the ECU 83 increases the throttle opening so as to increase the intake air amount and increases the fuel injection amount, thereby to maintain the stoichiometric air/fuel ratio. Immediately after time t1, the ECU 83 gradually retards the ignition timing. As a result, the amount of exhaust gas increases, and the increased exhaust gas drives the turbochargers 66, 67 more than necessary; whereby the actual boost pressure increases to a level greater than the requested boost pressure, and the actual ignition timing is retarded largely from the required ignition timing so as to prevent torque from increasing excessively.

In the engine of the first embodiment, therefore, if the actual boost pressure becomes equal to or higher than the target boost pressure that is set to be lower than the required boost pressure at time t2, the ECU 83 stops retarding the ignition timing any further and keeps the current retard amount, so that the boost pressure stops increasing. Subsequently, the ECU 83 corrects (i.e., increases) the fuel injection amount and the intake air amount through control of the throttle opening, in accordance with the actual boost pressure. Then, if the actual intake air amount becomes equal to or larger than the target intake air amount, the ECU 83 finishes the ignition timing retard control, and advances the ignition timing to the timing set in accordance with the engine operating conditions. Thereafter, the ECU 83 reduces the fuel injection amount so as to change the air/fuel ratio to a lean air/fuel ratio, and completes the control for switching the combustion mode from the non-supercharged stoichiometric combustion mode to the supercharged lean combustion mode.

As described above, the internal combustion engine of the first embodiment in the form of the V-type six-cylinder engine is provided with the turbochargers 66, 67 capable of compressing intake air and feeding the compressed air into the combustion chambers 22, 23, and the ECU 83 is capable of switching the combustion mode from the non-supercharged stoichiometric combustion mode to the supercharged lean combustion mode, depending on the engine operating conditions. During switching from the non-supercharged stoichiometric combustion mode to the supercharged lean combustion mode, the ECU 83 retards the ignition timing, and keeps the retard amount of the ignition timing at a constant value when the increasing actual boost pressure becomes equal to or higher than the target boost pressure.

It is thus possible to prevent torque from increasing excessively, by retarding the ignition timing during switching from the non-supercharged stoichiometric combustion mode to the supercharged lean combustion mode. By stopping further retarding the ignition timing and keeping the current retard amount when the actual boost pressure that rises due to retardation of the ignition timing becomes equal to or higher than the target boost pressure, it is possible to suppress or avoid an excessive increase in the boost pressure due to retardation of the ignition timing and a resulting increase in torque, and prevent the otherwise possible occurrence of a stepped change (e.g.; an abrupt reduction) in torque at the time of change of the air/fuel ratio, thus assuring improved driveability.

In this case, since the target boost pressure is set to a level that is lower by a certain amount than the required boost pressure set based on the operating conditions, such as the accelerator pedal position, an excessive increase in the boost pressure due to retardation of the ignition timing and a resulting increase in torque can be appropriately suppressed or avoided.

In the engine of the first embodiment, when the ECU 83 switches the combustion mode from the non-supercharged stoichiometric combustion mode to the supercharged lean combustion mode, the ECU 83 retards the ignition timing, and keeps the retard amount of the ignition timing at a constant value when the increasing actual boost pressure becomes equal to or higher than the preset target boost pressure, while controlling the throttle opening so that the actual intake air amount becomes equal to the target air amount set in advance depending on the operating conditions. Accordingly, the air/fuel ratio can be appropriately changed to a desired lean air/fuel ratio after switching of the combustion mode.

In the first embodiment as described above, the completion of the ignition timing retard control is determined by determining whether the actual intake air amount has become equal to or larger than the target intake air amount, and the accelerator pedal position is corrected by a large degree so as to make the actual intake air amount equal to the target intake air amount. However, even if the ignition timing stops being further retarded and the current retard amount is maintained when the actual boost pressure becomes equal to or higher than the target boost pressure, the actual boost pressure may increase to a level higher than the required boost pressure, and the actual intake air amount may exceed the required intake air amount. Therefore, the accelerator pedal position may be corrected by a large degree or a small degree so that the actual intake air amount falls in a target intake air amount optimum region that is set based on the target intake air amount.

Figure 6:
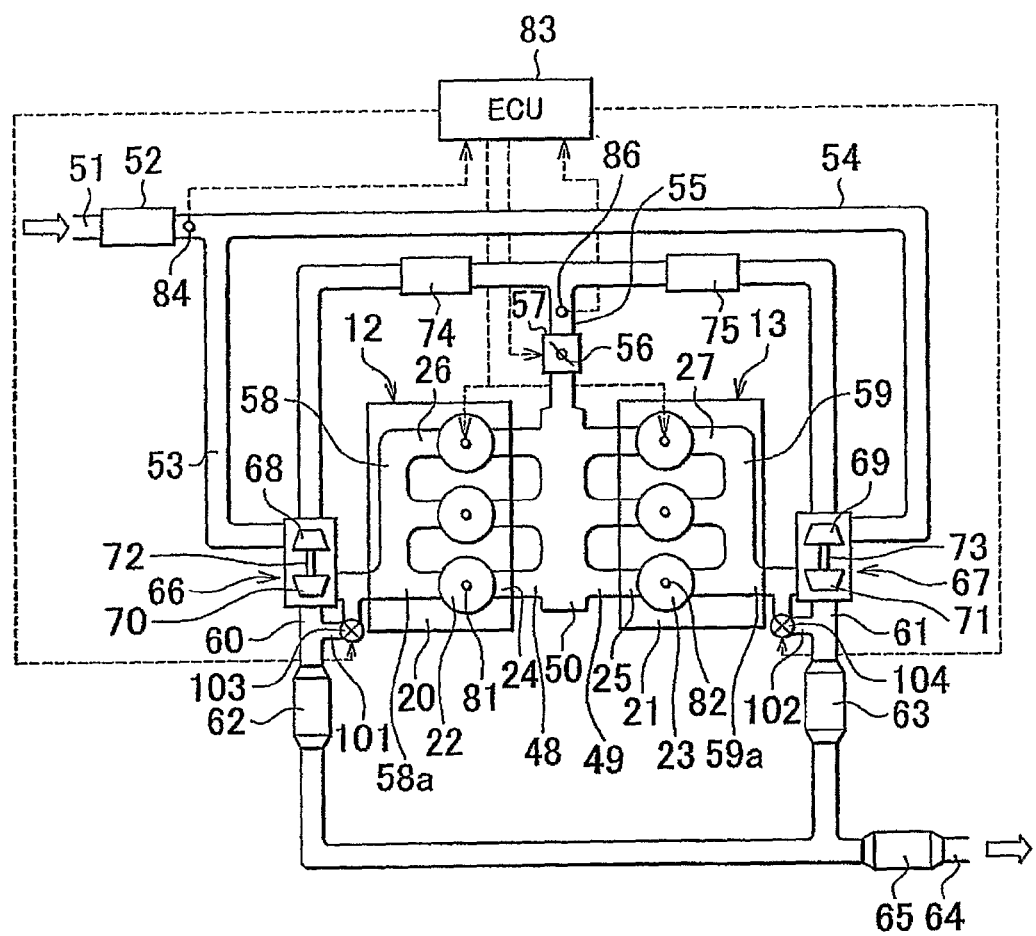
FIG. 6 is a schematic plan view of a V-type six-cylinder engine as an internal combustion engine according to a second embodiment of the invention.
Figure 7:
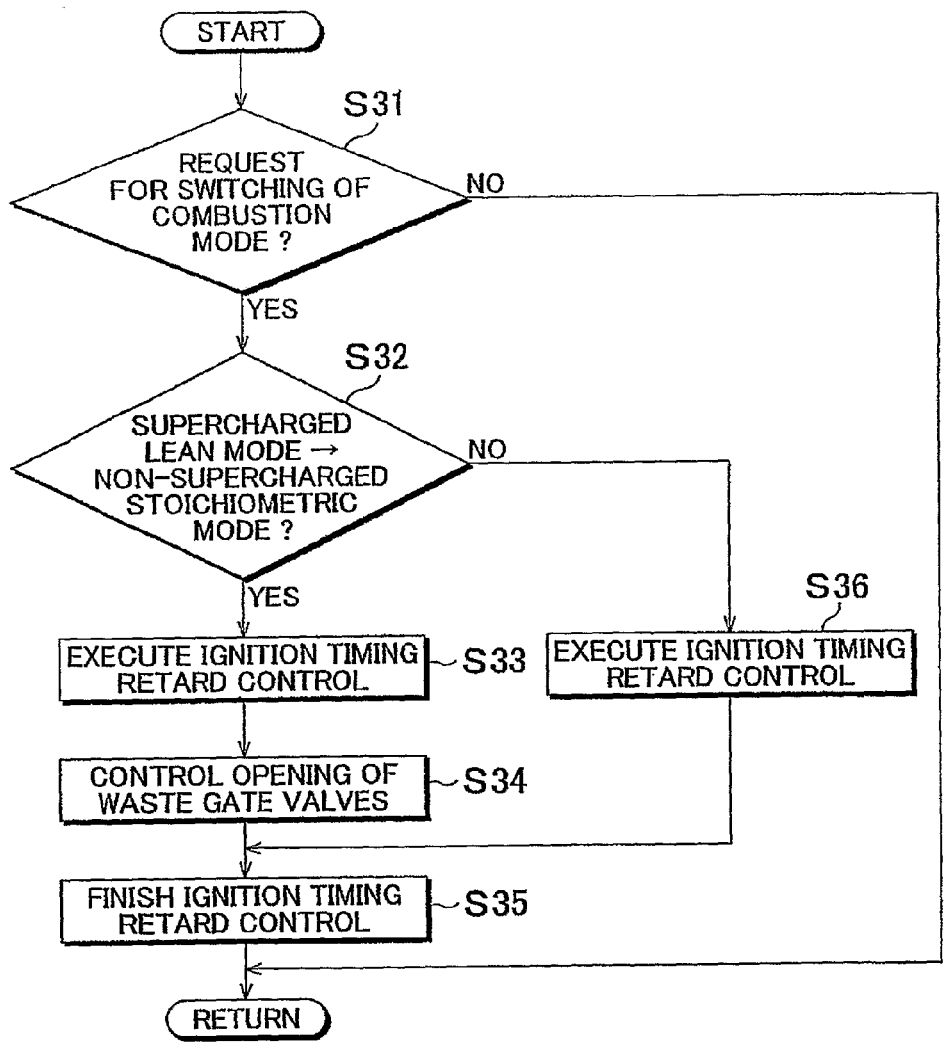
FIG. 7 is a flowchart illustrating a routine of combustion mode switching control performed on the V-type six-cylinder engine of the second embodiment.
Figure 8:
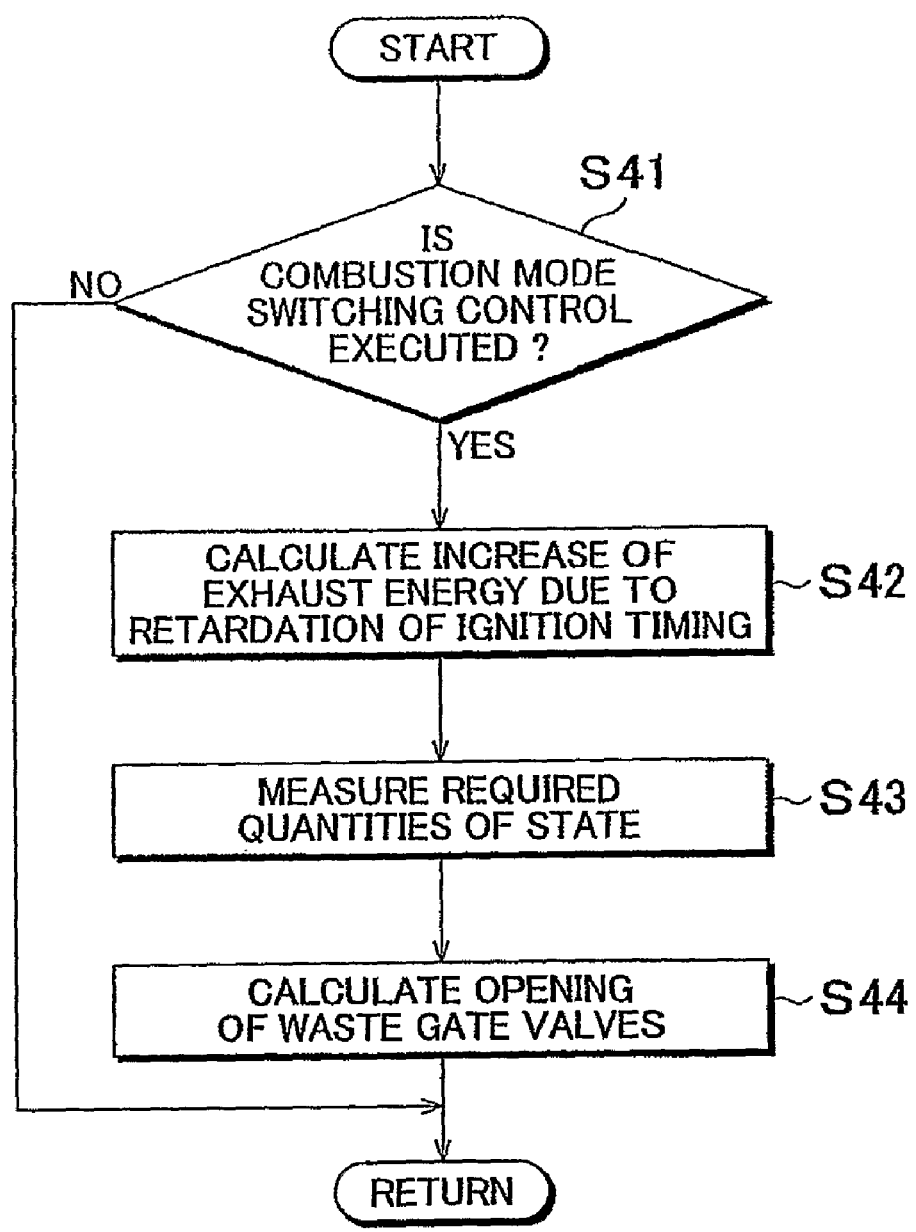
FIG. 8 is a flowchart illustrating a control routine for controlling the degree of opening of waste gate valves in the V-type six-cylinder engine of the second embodiment.
Figure 9:
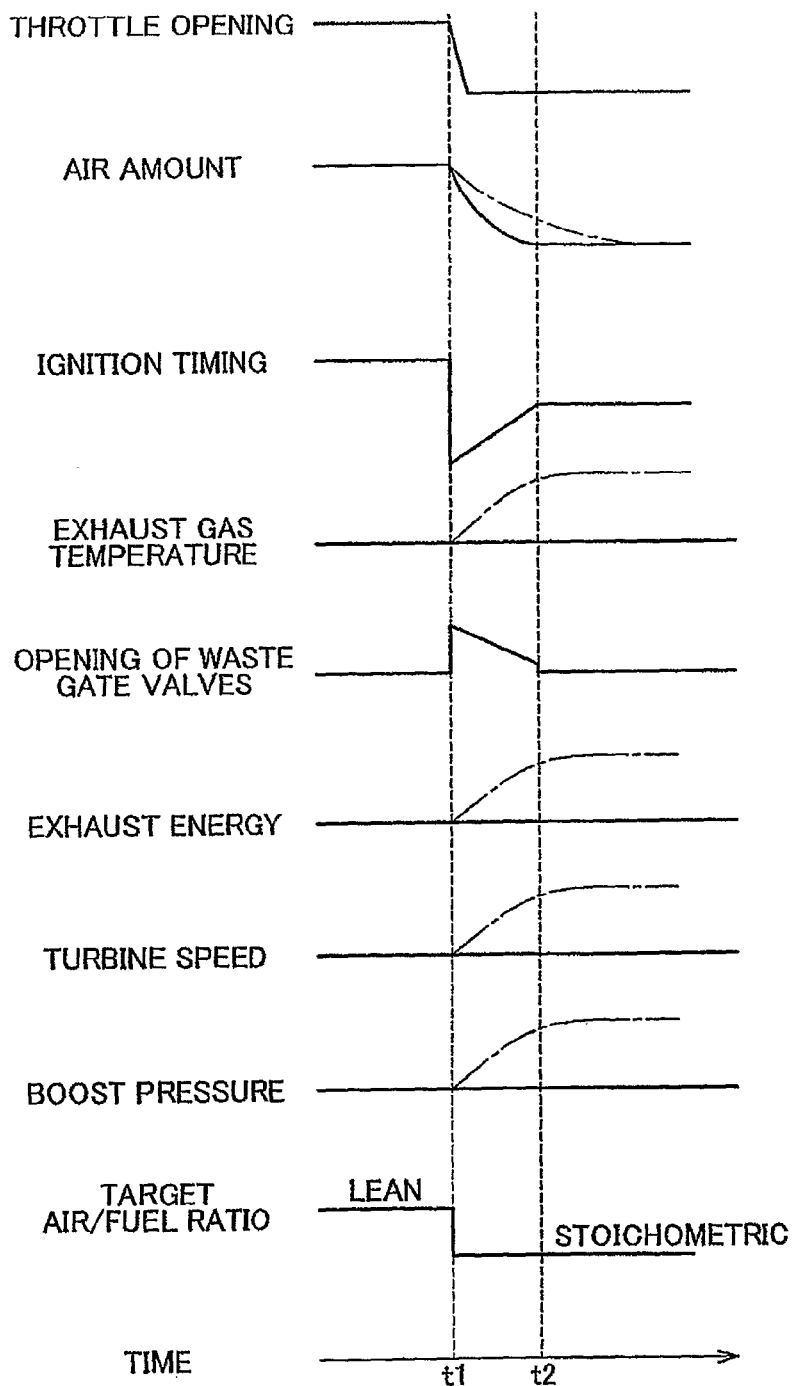
FIG. 9 is a time chart showing transitions in the engine operating conditions during switching of the combustion mode in the V-type six-cylinder engine of the second embodiment.

FIG. 6 is a schematic plan view of a V-type six-cylinder engine as an internal combustion engine according to a second embodiment of the invention, and FIG. 7 is a flowchart illustrating combustion mode switching control performed on the V-type six-cylinder engine of the second embodiment. FIG. 8 is a flowchart illustrating control of the degree of opening of waste gate valves provided in the V-type six-cylinder engine of the second embodiment, and FIG. 9 is a time chart showing transitions in engine operating conditions during switching of the combustion mode in the V-type six-cylinder engine of the second embodiment. In FIG. 6, the same reference numerals as used in FIG. 1 and FIG. 2 will be used for identifying the same or functionally corresponding elements or members as those of the first embodiment, and no further explanation of these elements will be provided.

In the V-type six-cylinder engine of the present embodiment, turbo-superchargers (which will be simply referred to as "turbochargers") 66, 67 are provided in the first bank 12 and the second bank 13, respectively, as shown in FIG. 6. Each of the turbochargers 66, 67 consists principally of a compressor 68, 69 provided in the corresponding intake branch pipe 53, 54, a turbine 70, 71 provided in the corresponding exhaust pipe 60, 61, and a coupling shaft 72, 73 that integrally couples the compressor 68, 69 with the turbine 70, 71. Also, bypass pipes (bypass passages) 101, 102 that bypass the respective turbines 70, 71 of the turbochargers 66, 67 are provided in the first and second exhaust pipes 60, 61, respectively, and waste gate valves 103, 104 are mounted in the respective bypass pipes 101, 102. The ECU 83 is able to open and close the waste gate valves 103, 104 in accordance with the boost pressure detected by the boost pressure sensor 86.

With the above arrangement, the turbochargers 66, 67 provided in the first and second banks 12, 13 are operable to compress air flowing in the intake branch pipes 53, 54, by causing exhaust gases discharged from the respective combustion chambers 22, 23 into the exhaust pipes 60, 61 via the exhaust ports 26, 27 and collection passages 58, 59 to drive the turbines 70, 71, and causing the turbines 70, 71 to drive the compressors 68, 69 coupled to the turbines 70, 71 with the coupling shafts 72, 73. The compressed air is then fed from the surge tank 50 into the combustion chambers 22, 23 of the respective banks 12, 13. During this operation, if the boost pressure detected by the boost pressure sensor 86 reaches a predetermined boost pressure, the ECU 83 opens the waste gate valves 103, 104, and cause excess exhaust gas to pass through the bypass pipes 101, 102, so as to restrict rotation of the turbines 70, 71 and thus prevent the compressors 68, 68 from further compressing air.

In the V-type six-cylinder engine of the second embodiment, the ECU 83 is capable of switching the combustion mode between the lean combustion mode and the stoichiometric combustion mode, and performs the switching control using a combustion mode map in which the combustion mode is set based on the engine speed and the engine load. When the ECU 83 controls switching between the lean combustion mode and the stoichiometric combustion mode, the engine is operated at the stoichiometric air/fuel ratio during the switching control, and the air/fuel ratio is changed after the switching control. In the second embodiment, when the ECU 83 changes the combustion mode (the air/fuel ratio) from the supercharged lean combustion mode (a lean air/fuel ratio) to the non-supercharged stoichiometric combustion mode (the stoichiometric air/fuel ratio) while retarding the ignition timing, the ECU 83 increases the degree of opening of the waste gate valves 103, 104 serving as exhaust escape valves in accordance with the amount of increase of exhaust energy during the switching control of the combustion mode (during the control for changing the air/fuel ratio). In this manner, the boost pressure is prevented from excessively increasing due to the increase of the exhaust energy during switching of the combustion mode, and the otherwise possible occurrence of a stepped change (e.g., an abrupt reduction) in torque is suppressed or avoided upon the completion of the combustion mode switching control.

In this case, the ECU 83 calculates the amount of increase of the exhaust energy based on the amount of increase of the exhaust gas temperature during the combustion mode switching control, and sets the degree of opening of the waste gate valves 103, 104 based on the amount of increase of the exhaust energy and the amount of flow of the exhaust gas, as will be described later.

In the following, the combustion mode switching control performed on the V-type six-cylinder engine of the present embodiment as described above will be more specifically explained with reference to the flowchart of FIG. 7.

In the V-type six-cylinder engine of the present embodiment, the ECU 83 determines in step S31 whether a command as a request for switching of the combustion mode has been issued, based on the engine operating conditions, and finishes one cycle of this routine without executing any further steps if the ECU 83 determines that there is no command or request for switching of the combustion mode, as shown in FIG. 7. If the ECU 83 determines that a command as a request for switching of the combustion mode has been issued, the ECU 83 then determines in step S32 whether the request for switching of the combustion mode is a request to switch the combustion mode from the supercharged lean combustion mode to the non-supercharged stoichiometric combustion mode. If it is determined that the request is not that for switching from the supercharged lean combustion mode to the non-supercharged stoichiometric combustion mode, the ECU 83 executes normal ignition timing retard control in step S36.

If, on the other hand, the ECU 83 determines in step S32 that the switching request is that for switching from the supercharged lean combustion mode to the non-supercharged stoichiometric combustion mode, the ECU 83 executes ignition timing retard control in step S33. While the intake air amount is reduced so as to establish the stoichiometric air/fuel ratio during switching control from the supercharged lean combustion mode to the non-supercharged stoichiometric combustion mode, the exhaust gas temperature is raised and the boost pressure is increased due to retardation of the ignition timing. Therefore, the ECU 83 increases the degree of opening of the waste gate valves 103, 104 during the combustion mode switching control, so as to restrict or avoid an increase of the boost pressure. With the waste gate valves 103, 104 thus opened, excess exhaust gas is discharged from the bypass pipes 101, 102 without passing the turbine 70, 71, and the boost pressure is prevented from increasing due to an otherwise possible increase in the rotational speed of the turbines 70, 71. Then, if the combustion mode switching control is finished, the ignition timing retard control is finished in step S35.

The control of the degree of opening of the waste gate valves 103, 104 performed in step S34 will be explained in more detail with reference to the flowchart of FIG. 8.

In the control of the degree of opening of the waste gate valves 103, 104, it is determined in step S41 whether the combustion mode switching control is being executed, and one cycle of this routine is finished without executing any further steps if it is determined that the combustion mode switching control is not being executed, as shown in FIG. 8. If it is determined that the combustion mode switching control is being executed, the ECU 83 proceeds to step S42.

In step S42, the ECU 83 calculates the amount of increase of the exhaust energy due to retardation of the ignition timing. More specifically, the ECU 83 stores a temperature map indicating the exhaust gas temperature that increases in response to retardation of the ignition timing. The exhaust energy can be generally expressed by the low-pressure specific heat of the gas, gas flow rate and the gas temperature, and the amount of increase of the exhaust energy due to retardation of the ignition timing can be expressed by the following equation (1):

$$e_{d\_cylout} = C_p m (T_{cyl} - T_{ex0}) \qquad (1)$$

where,
$e_{d\_cylout}$: amount of increase of exhaust energy
$C_p$: specific heat at constant pressure
m: gas flow rate
$T_{cyl}$: exhaust gas temperature during retardation
$T_{ex0}$: temperature of exhaust collection pipes Next, the required quantities of state are measured in step S43. More specifically, it is necessary to open the waste gate valves 103, 104 and cause exhaust gas to pass through the bypass pipes 101, 102 while bypassing the turbines 70, 71, so that the energy of the exhaust gas passing through the bypass pipes 101, 102 coincides with the amount of increase of the exhaust energy due to retardation of the ignition timing. Here, the flow rate of the exhaust gas passing through the bypass pipes 101, 102 in which the waste gate valves 103, 104 are opened can be expressed by the following equation (2):

$$m_{WGV} = A_{WGV} P_{ex} \sqrt{\frac{2}{RT_{ex}}} \phi \qquad (2)$$

$$\phi = \begin{cases} \sqrt{\frac{k}{k-1}\left\{\left(\frac{P_{air}}{P_{ex}}\right)^{\frac{2}{k}} - \left(\frac{P_{air}}{P_{ex}}\right)^{\frac{k+1}{k}}\right\}} & \cdots \left(\frac{P_{air}}{P_{ex}}\right) > \left(\frac{2}{k+1}\right)^{\frac{k}{k-1}} \\ \left(\frac{2}{k+1}\right)^{\frac{1}{k-1}} \sqrt{\frac{k}{k+1}} & \cdots \left(\frac{P_{air}}{P_{ex}}\right) < \left(\frac{2}{k+1}\right)^{\frac{k}{k-1}} \end{cases}$$

where,
$m_{WGV}$: flow rate of exhaust gas at waste gate valves
$A_{WGV}$: degree of opening of waste gate valves
R: gas constant
$T_{ex}$: temperature of exhaust collection pipes
k: specific heat
$P_{ex}$: exhaust gas pressure
$P_{air}$: atmospheric pressure The energy of the exhaust gas that flows through the bypass pipes 101, 102 in which the waste gate valves 103, 104 are opened can be expressed by the following equation (3):

$$e_{WGV} = C_p m_{WGV} T_{ex} \qquad (3)$$

Then, the degree of opening of the waste gate valves 103, 104 is calculated in step S44. More specifically, the increased amount of the exhaust energy calculated according to the above-indicated equation (1) needs to be discharged or released as the energy of the exhaust gas that flows through the bypass pipes 101, 102 in which the waste gate valves 103, 104 are opened, which is calculated according to the above-indicated equation (3). Thus, the values obtained from these equations (1), (3) are made equal to each other, and the degree of opening of the waste gate valves 103, 104 can be calculated as indicated, below and expressed by the following equation (4).

$$e_{WGV} = e_{d\_cylout} \qquad (4)$$

$$C_p m_{WGV} T_{ex} = C_p m (T_{cyl} - T_{cyl0})$$

$$A_{WGV} P_{ex} \sqrt{\frac{2}{RT_{ex}}} \phi T_{ex} = m(T_{cyl} + T_{cyl0})$$

$$A_{WGV} = \frac{m(T_{cyl} - T_{cyl0})}{P_{ex} \sqrt{\frac{2}{RT_{ex}}} \phi T_{ex}}$$

Assuming that there is no heat transfer in the exhaust collection passages 58, 59, the exhaust gas temperature during ignition retard control is equal to the temperature of the exhaust collection passages 58, 59. The exhaust gas temperature that varies with retardation of the ignition timing is obtained from the above-mentioned exhaust gas temperature map, and the flow rate of exhaust gas is derived from the intake air amount detected by the air flow meter 84. Then, the degree of opening of the waste gate valves 103, 104 can be calculated by substituting the thus obtained temperature and, flow rate of exhaust gas into the above-indicated equation (4).

In the following, transitions in the engine operating conditions due to the combustion mode switching control performed on the V-type six-cylinder engine of the present embodiment will be more specifically explained with reference to the time chart of FIG. 9.

In the V-type six-cylinder engine of the present embodiment, if a request for switching from the supercharged lean combustion mode to the non-supercharged stoichiometric combustion mode is made at time t1, the throttle opening is reduced so as to reduce the intake air amount and change the air/fuel ratio to the stoichiometric air/fuel ratio, and the ignition timing is immediately retarded and then gradually advanced, as shown in FIG. 9. As a result, the exhaust gas temperature is raised due to retardation of the ignition timing, and the turbine speed of the turbochargers 66, 67 is increased, so that the boost pressure is increased, as indicated by one-dot chain lines in FIG. 9. In this case, it is difficult to prevent torque from increasing to be larger than necessary.

In the present embodiment, therefore, the waste gate valves 103, 104 are opened during switching control from the supercharged lean combustion mode to the non-supercharged stoichiometric combustion mode, so that excess exhaust gas is discharged from the bypass pipes 101, 102 without passing the turbines 70, 71. As a result, otherwise possible increases in the exhaust gas temperature, turbine speed and the boost pressure are restricted or avoided, and an increase in the intake air amount is also restricted or avoided. If the combustion mode switching control is finished at time t2, the ignition timing is set to the timing suitable for the engine operating conditions, and the waste gate valves 103, 104 are closed, so that the switching control of the combustion mode from the supercharged lean combustion mode to the non-supercharged stoichiometric combustion mode is completed.

As described above, the internal combustion engine of the second embodiment in the form of the V-type six-cylinder engine is provided with the turbochargers 66, 67 capable of compressing intake air and feeding the compressed air into the combustion chambers 22, 23, and the waste gate valves 103, 104 are mounted in the bypass pipes 101, 102 that bypass the turbines 70, 71. The ECU 83 is capable of switching the combustion mode from the supercharged lean combustion mode to the non-supercharged stoichiometric combustion mode, depending on the engine operating conditions. When switching from the supercharged lean combustion mode to the non-supercharged stoichiometric combustion mode, the ECU 83 retards the ignition timing, and increases the degree of opening of the waste gate valves 103, 104 in accordance with the amount of increase of the exhaust energy during the combustion mode switching control.

With the above arrangement, it is possible to prevent torque from increasing excessively, by retarding the ignition timing during switching from the supercharged lean combustion mode to the non-supercharged stoichiometric combustion mode. By opening the waste gate valves 103, 104 and causing excess exhaust gas to be discharged without passing the turbines 70, 71, it is also possible to prevent an excessive increase in the boost pressure due to retardation of the ignition timing and a resulting increase in torque, thus preventing the otherwise possible occurrence of a stepped change (e.g., an abrupt reduction) in torque at the time of change of the air/fuel ratio, and assuring improved driveability.

In this case, the amount of increase of the exhaust energy is calculated based on the amount of increase of the exhaust gas temperature during the combustion mode switching control, and the degree of opening of the waste gate valves 103, 104 is set based on the thus calculated amount of increase of the exhaust energy and the flow rate of the exhaust gas. By appropriately setting the degree of opening of the waste gate valves 103, 104 depending on the engine operating conditions, the boost pressure can be appropriately prevented from increasing to a level higher than necessary due to retardation of the ignition timing.

In the second embodiment as described above, when the ECU 83 changes the combustion mode (the air/fuel ratio) from the supercharged lean combustion mode (a lean air/fuel ratio) to the non-supercharged stoichiometric combustion mode (the stoichiometric air/fuel ratio) while retarding the ignition timing, the ECU 83 increases the degree of opening of the waste gate valves 103, 104 in accordance with the amount of increase of the exhaust energy during the combustion mode switching control. However, when the ECU 83 changes the combustion mode (the air/fuel ratio) from the non-supercharged stoichiometric combustion mode (the stoichiometric air/fuel ratio) to the supercharged lean combustion mode (a lean air/fuel ratio) while retarding the ignition timing, the ECU 83 may determine whether the boost pressure detected by the boost pressure sensor 86 has become equal to or higher than a target boost pressure that is set in advance depending on the operating conditions, as in the above-described first embodiment, and may increase the degree of opening of the waste gate valves 103, 104 in accordance with the amount of increase of the exhaust energy if it is determined that the boost pressure has become equal to or higher than the target boost pressure.

Figure 10:
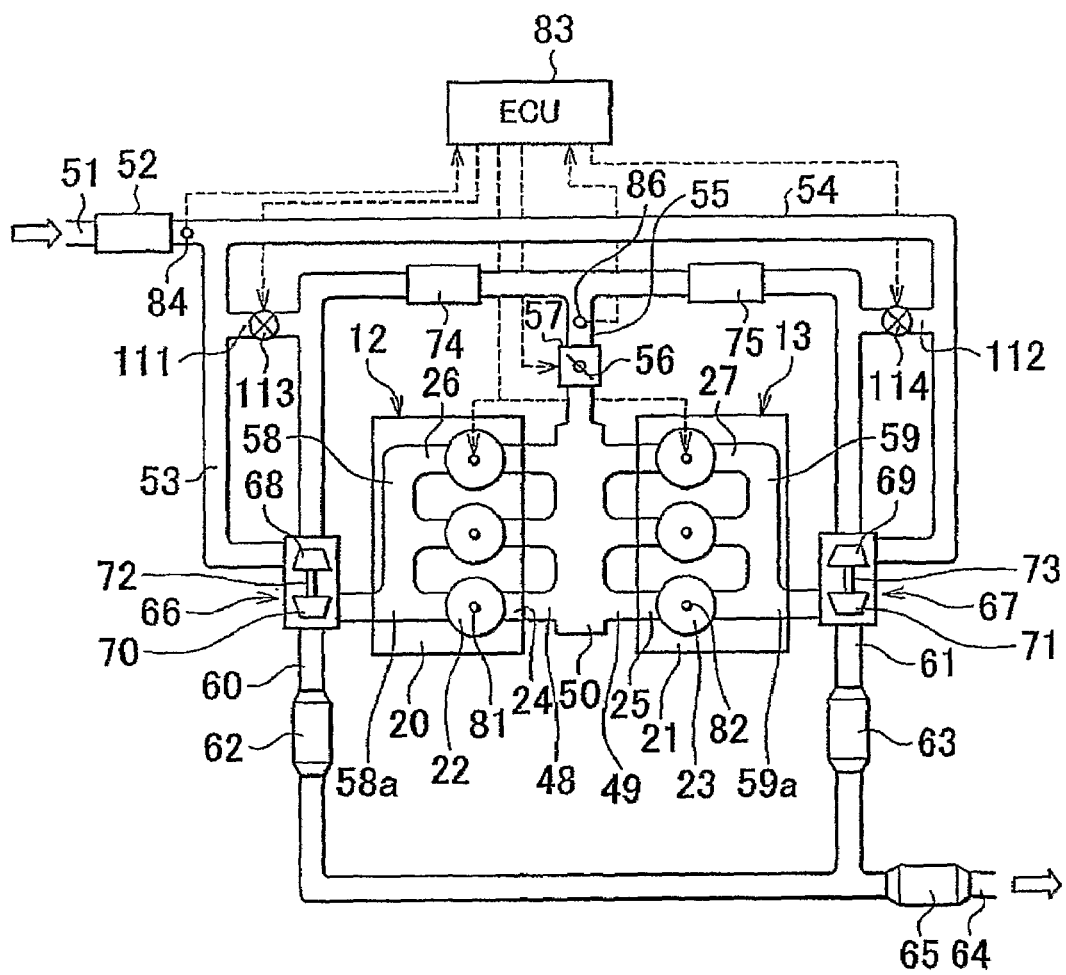
FIG. 10 is a schematic plan view of a V-type six-cylinder engine as an internal combustion engine according to a third embodiment of the invention.
Figure 11:
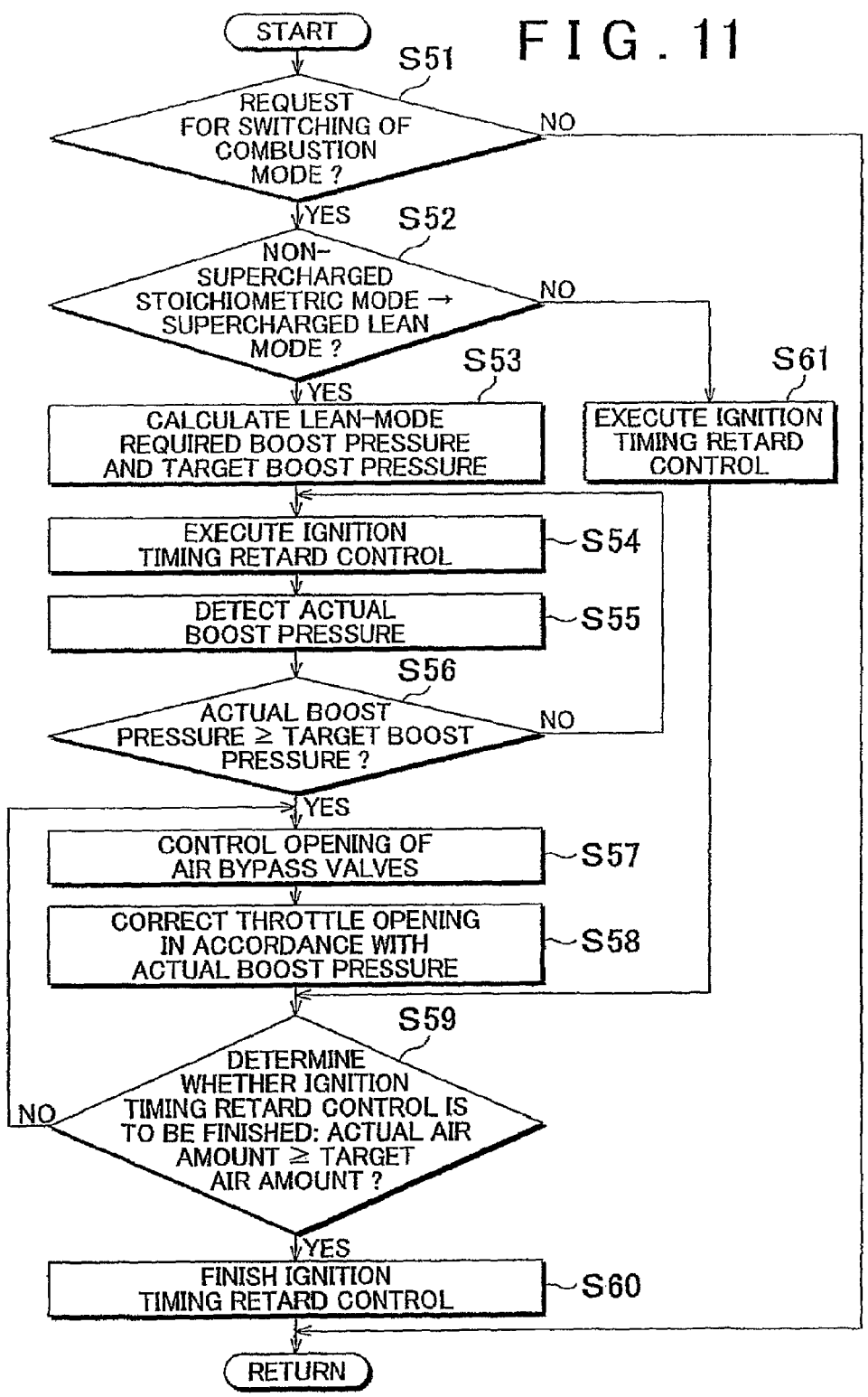
FIG. 11 is a flowchart illustrating a routine of combustion mode switching control performed on the V-type six-cylinder engine of the third embodiment.
Figure 12:
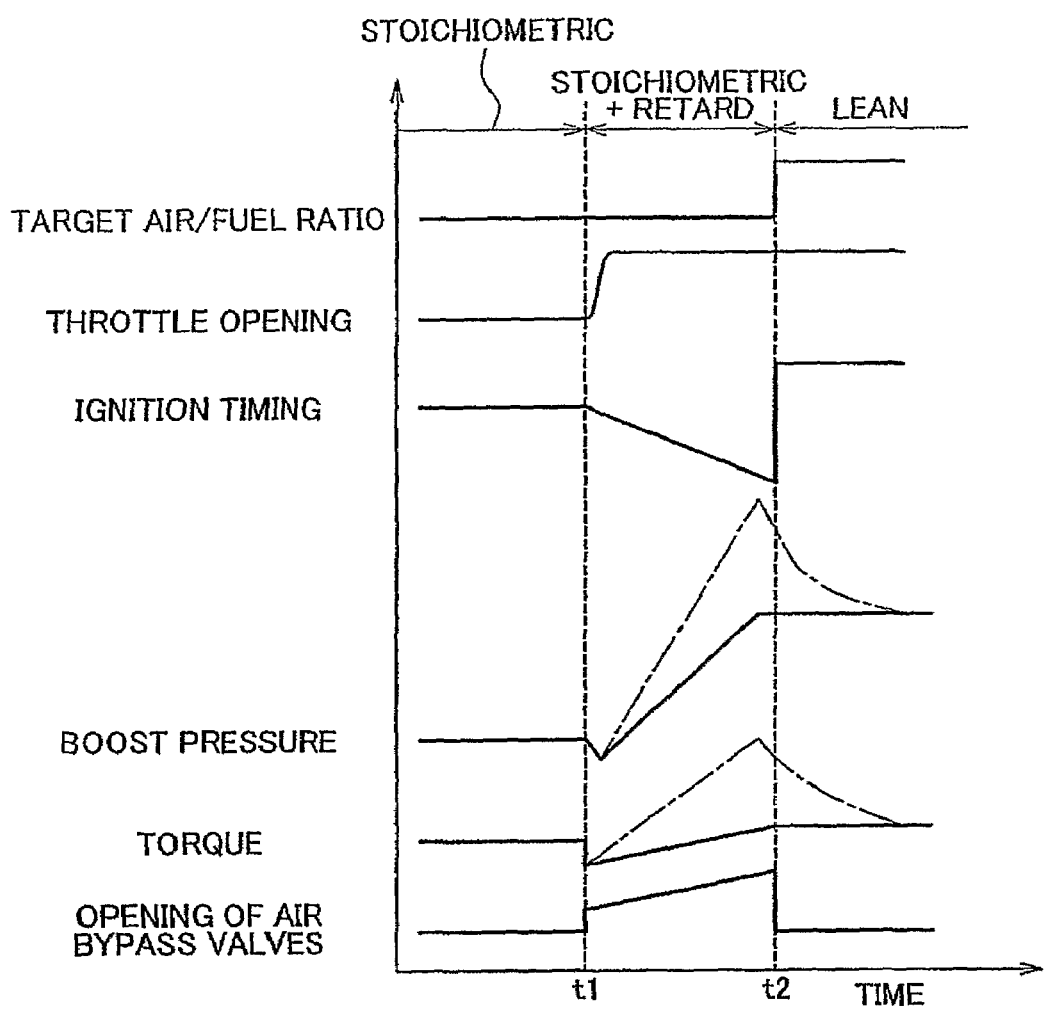
FIG. 12 is a time chart showing transitions in the engine operating conditions during switching of the combustion mode in the V-type six-cylinder engine of the third embodiment.
Figure 13:
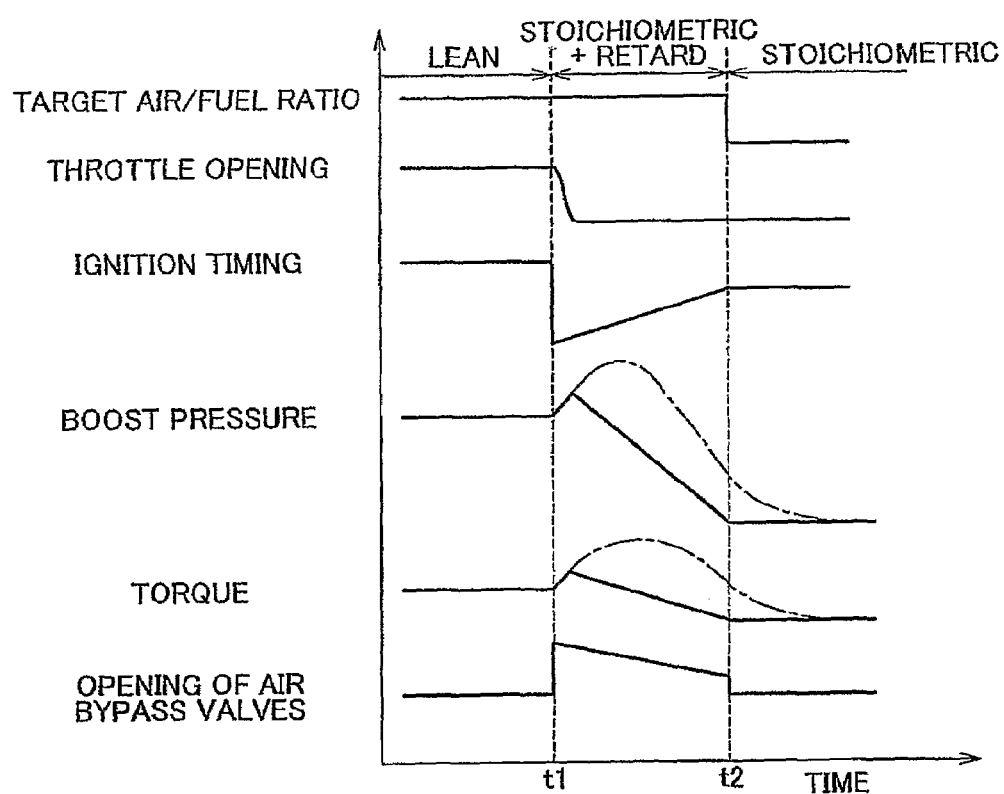
FIG. 13 is a time chart showing transitions in the engine operating conditions during switching of the combustion mode in the V-type six-cylinder engine of the third embodiment.

FIG. 10 is a schematic plan view of a V-type six-cylinder engine as an internal combustion engine according to a third embodiment of the invention, and FIG. 11 is a flowchart illustrating a routine of combustion mode switching control performed on the V-type six-cylinder engine of the third embodiment. FIG. 12 and FIG. 13 are time charts indicating transitions in the engine operating conditions during switching of the combustion mode in the V-type six-cylinder engine of the third embodiment. In FIG. 10, the same reference numerals as used in the previous embodiments are used for identifying the same or functionally corresponding elements of members, of which no further explanation will be provided.

In the V-type six-cylinder engine of the present embodiment, the surge tank 50 is connected to the intake ports 24, 25 of the respective cylinder heads 20, 21 via the intake manifolds 48, 49, as shown in FIG. 10. The intake pipe 51 is divided into two intake branch pipes 53, 54, and the compressors 68, 69 of the turbochargers 66, 67 are respectively mounted in the intake branch pipes 53, 54. The intake branch pipes 53, 54 are joined together at their downstream ends, and are connected to the surge tank 50 via the intake collection pipe 55. In the present embodiment, return pipes (return passages) 111, 112 are provided for feeding air compressed by the compressors 68, 69 of the turbochargers 66, 67 back to the intake branch pipes 53, 54 upstream of the compressors 68, 69. The return pipes 111, 112 are arranged to connect the upstream sides of the compressors 68, 69 with the downstream sides thereof in the intake branch pipes 53, 54, and air bypass valves 113, 114 as intake-air escape valves are mounted in the return pipes 111, 112, respectively. The ECU 83 is able to open and close the air bypass valves 113, 114 depending on the boost pressure detected by the boost pressure sensor 86.

In the V-type six-cylinder engine of the third embodiment, the ECU 83 is able to switch the combustion mode between the lean combustion mode and the stoichiometric combustion mode, and performs switching control using a combustion mode map in which the combustion mode is set based on the engine speed and the engine load. When the ECU 83 controls switching between the lean combustion mode and the stoichiometric combustion mode, the engine is operated at the stoichiometric air/fuel ratio during the switching control, and the air/fuel ratio is changed as needed after the switching control. In the third embodiment, when the ECU 83 changes the combustion mode (the air/fuel ratio) from the non-supercharged stoichiometric combustion mode (the stoichiometric air/fuel ratio) to the supercharged lean combustion mode (a lean air/fuel ratio) while retarding the ignition timing, the ECU 83 increases the degree of opening of the air bypass valves 113, 114 in accordance with the amount of increase of the boost pressure when the boost pressure detected by the boost pressure sensor 86 becomes equal to or higher than a target boost pressure that is set in advance depending on the engine operating conditions. In this manner, the boost pressure is prevented from excessively increasing due to an increase of the exhaust energy during switching of the combustion mode, and the otherwise possible occurrence of a stepped change (e.g., an abrupt reduction) in torque is prevented at the time of the completion of the air/fuel ratio (or combustion mode) switching control.

In the following, the combustion mode switching control performed on the V-type six-cylinder engine of the present embodiment as described above will be more specifically explained with reference to the flowchart of FIG. 11.

In the V-type six-cylinder engine of the present embodiment, the ECU 83 determines in step S51 whether a command as a request for switching of the combustion mode has been issued, based on the engine operating conditions, and finishes one cycle of this routine without executing any further steps if it is determined that there is no command or request for switching of the combustion mode, as shown in FIG. 11. If the ECU 83 determines that a command as a request for switching of the combustion mode has been issued, the ECU 83 determines in step S52 whether the request for switching of the combustion mode is a request to switch the combustion mode from the non-supercharged stoichiometric combustion mode to the supercharged lean combustion mode. If it is determined that the switching request is not that for switching from the non-supercharged stoichiometric combustion mode to the supercharged lean combustion mode, the ECU 83 executes normal ignition timing retard control in step S61.

If, on the other hand, the ECU 83 determines in step S52 that the switching request is that for switching from the non-supercharged stoichiometric combustion mode to the supercharged lean combustion mode, step S53 is executed to calculate a lean-mode required boost pressure based on the accelerator pedal position detected by the accelerator position sensor 88, and calculate a lean-mode target boost pressure by subtracting a predetermined value from the lean-mode required boost pressure. The ECU 83 then proceeds to step S54 to execute ignition timing retard control.

Then, the ECU 83 retrieves the boost pressure (actual boost pressure) detected by the boost pressure sensor 86 in step S55, and determines in step S56 whether the actual boost pressure has become equal to or higher than the target boost pressure. If it is determined that the actual boost pressure has not become equal to or higher than the target boost pressure during the combustion mode switching control, steps S54 through S56 are repeatedly executed. If, on the other hand, it is determined that the actual boost pressure has become equal to or higher than the target boost pressure, control of the degree of opening of the air bypass valves 113, 114 is performed, namely, the air bypass valves 113, 114 are opened by a set degree, in step S57. With the air bypass valves 113, 114 thus opened, excess compressed air is fed back to the upstream sides of the compressors 68, 69 through the return pipes 111, 112, without being drawn into the combustion chambers 22, 23, and therefore, the boost pressure is prevented from excessively increasing. In this case, the ECU 83 calculates the amount of increase of the boost pressure, based on the boost pressure detected by the boost pressure sensor 86 before the combustion mode switching control and the boost pressure detected by the boost pressure sensor 86 during the combustion mode switching control, and the degree of opening of the air bypass valves 113, 114 is set based on the amount of increase of the boost pressure. In this connection, the ECU 83 stores a map that defines the relationship between the degree of opening of the air bypass valves 113, 114 and the amount of increase of the boost pressure, and the degree of opening of the air bypass valves 113, 114 is determined based on this map.

After execution of step S57, the ECU 83 corrects the throttle opening in accordance with the actual boost pressure in step S58, and determines whether the ignition timing retard control is to be finished in step S59 by determining whether the actual intake air amount has become equal to or larger than a target intake air amount. Since the actual boost pressure does not reach the required boost pressure even if the actual boost pressure increases to a level equal to or higher than the target boost pressure during the combustion mode switching control, the accelerator pedal position is largely corrected so that the actual intake air amount becomes equal to the target intake air amount. If it is determined in step S59 that the actual intake air amount has not become equal to or larger than the target intake air amount, steps S57 and S58 are repeatedly executed. If it is determined in step S59 that the actual intake air amount has become equal to or larger than the target intake air amount, step S60 is executed to finish the ignition timing retard control.

In the following, transitions in the engine operating conditions due to the combustion mode switching control in the V-type six-cylinder engine of the present embodiment will be specifically explained with reference to the time chart of FIG. 12.

In the V-type six-cylinder engine of the present embodiment, if a request for switching from the non-supercharged stoichiometric combustion mode to the supercharged lean combustion mode is made at time t1, the ECU 83 increases the throttle opening so as to increase the intake air amount, and also increases the fuel injection amount, thereby to maintain the stoichiometric air/fuel ratio. Immediately after time t1, the ECU 83 gradually retards the ignition timing. As a result, the exhaust gas temperature and the turbine speed of the turbochargers 66, 67 increase due to retardation of the ignition timing, as indicated by the one-dot chain lines in FIG. 9, resulting in an increase of the boost pressure, which makes it difficult to prevent torque from increasing to be larger than necessary.

In the present embodiment, therefore, the air bypass valves 113, 114 are opened during switching control from the non-supercharged stoichiometric combustion mode to the supercharged lean combustion mode, so that excess compressed air is fed back to the upstream sides of the compressors 68, 69 through the return pipes 111, 112 without being drawn into the combustion chambers 22, 23. As a result, increases in the exhaust gas temperature and the turbine speed are restricted or avoided, and the torque is prevented from excessively increasing due to the otherwise possible increase in the boost pressure. If the combustion mode switching control is finished at time t2, the ignition timing is advanced and set to the timing suitable for the engine operating conditions, and the air bypass valves 113, 114 are closed. Thus, the control for switching the combustion mode from the non-supercharged stoichiometric combustion mode to the supercharged lean combustion mode is completed.

In the third embodiment as described above, when the ECU 83 changes the combustion mode (the air/fuel ratio) from the non-supercharged stoichiometric combustion mode (the stoichiometric air/fuel ratio) to the supercharged lean combustion mode (a lean air/fuel ratio) while retarding the ignition timing, the ECU 83 determines whether the boost pressure detected by the boost pressure sensor 86 has become equal to or higher than the target boost pressure set in advance based on the operating conditions, and increases the degree of opening of the air bypass valves 113, 114 in accordance with the amount of increase of the boost pressure if it is determined that the boost pressure has become equal to or higher than the target boost pressure. However, when the ECU 83 changes the combustion mode (the air/fuel ratio) from the supercharged lean combustion mode (a lean air/fuel ratio) to the non-supercharged stoichiometric combustion mode (the stoichiometric air/fuel ratio) while retarding the ignition timing, the degree of opening of the air bypass valves 113, 114 may be controlled so as to increase in accordance with the amount of increase of the boost pressure during the combustion mode switching control.

In this case, if a request for switching from the supercharged lean combustion mode to the non-supercharged stoichiometric combustion mode at time t1 as shown in FIG. 13, the ECU 83 reduces the intake air amount by reducing the throttle opening so as to change the air/fuel ratio to the stoichiometric air/fuel ratio, and immediately retards the ignition timing and then gradually advances the ignition timing. As a result, the exhaust gas temperature and the turbine speed of the turbochargers 66, 67 increase due to retardation of the ignition timing, as indicated by the one-dot chain lines in FIG. 9, resulting in an increase in the boost pressure, which makes it difficult to prevent torque from increasing to be larger than necessary.

In the present embodiment, therefore, the air bypass valves 113, 114 are opened during the switching control from the supercharged lean combustion mode to the non-supercharged stoichiometric combustion mode, so that excess compressed air is fed back to the upstream sides of the compressors 68, 69 through the return pipes 111, 112 without being drawn into the combustion chambers 22, 23. Therefore, the increases in the exhaust gas temperature and the turbine speed are restricted or avoided, and the torque is prevented from excessively increasing due to the otherwise possible increase in the boost pressure. If the combustion mode switching control is finished at time t2, the ignition timing is set to the timing suitable for the engine operating conditions, and the air bypass valves 113, 114 are closed. Thus, the control for switching the combustion mode from the supercharged lean combustion mode to the non-supercharged lean combustion mode is completed.

As described above, the internal combustion engine of the third embodiment in the form of the V-type six-cylinder engine is provided with the turbochargers 66, 67 capable of compressing intake air and feeding the compressed air into the combustion chambers 22, 23, and the air bypass valves 113, 114 are mounted in the return pipes 111, 112 through which the compressed air is fed back to the upstream sides of the compressors 68, 69. The ECU 83 is able to switch the combustion mode from the non-supercharged stoichiometric combustion mode to the supercharged lean combustion mode, depending on the engine operating conditions. When switching from the non-supercharged stoichiometric combustion mode to the supercharged lean combustion mode is made, the ECU retards the ignition timing, and increases the degree of opening of the air bypass valves 113, 114 in accordance with the amount of increase of the boost pressure when the increasing actual boost pressure becomes equal to or higher than the target boost pressure.

The ECU 83 is also able to switch the combustion mode from the supercharged lean combustion mode to the non-supercharged stoichiometric combustion mode, depending on the engine operating conditions. When switching from the supercharged lean combustion mode to the non-supercharged stoichiometric combustion mode, the ECU 83 retards the ignition timing, and increases the degree of opening of the air bypass valves 113, 114 in accordance with the amount of increase of the boost pressure during the combustion mode switching control.

It is thus possible to prevent torque from increasing to be larger than necessary, by retarding the ignition timing during switching between the non-supercharged stoichiometric combustion mode and the supercharged lean combustion mode. Furthermore, the air bypass valves 113, 114 are opened during the combustion mode switching control so that excess compressed air is fed back to the upstream sides of the compressors 68, 69 through the return pipes 111, 112 without being drawn into the combustion chamber 22, 23. Therefore, excessive increases in the boost pressure and torque due to retardation of the ignition timing can be avoided, and the otherwise possible occurrence of a stepped change (e.g., an abrupt reduction) in torque is prevented at the time of change of the air/fuel ratio, thus assuring improved driveability.

Figure 14:
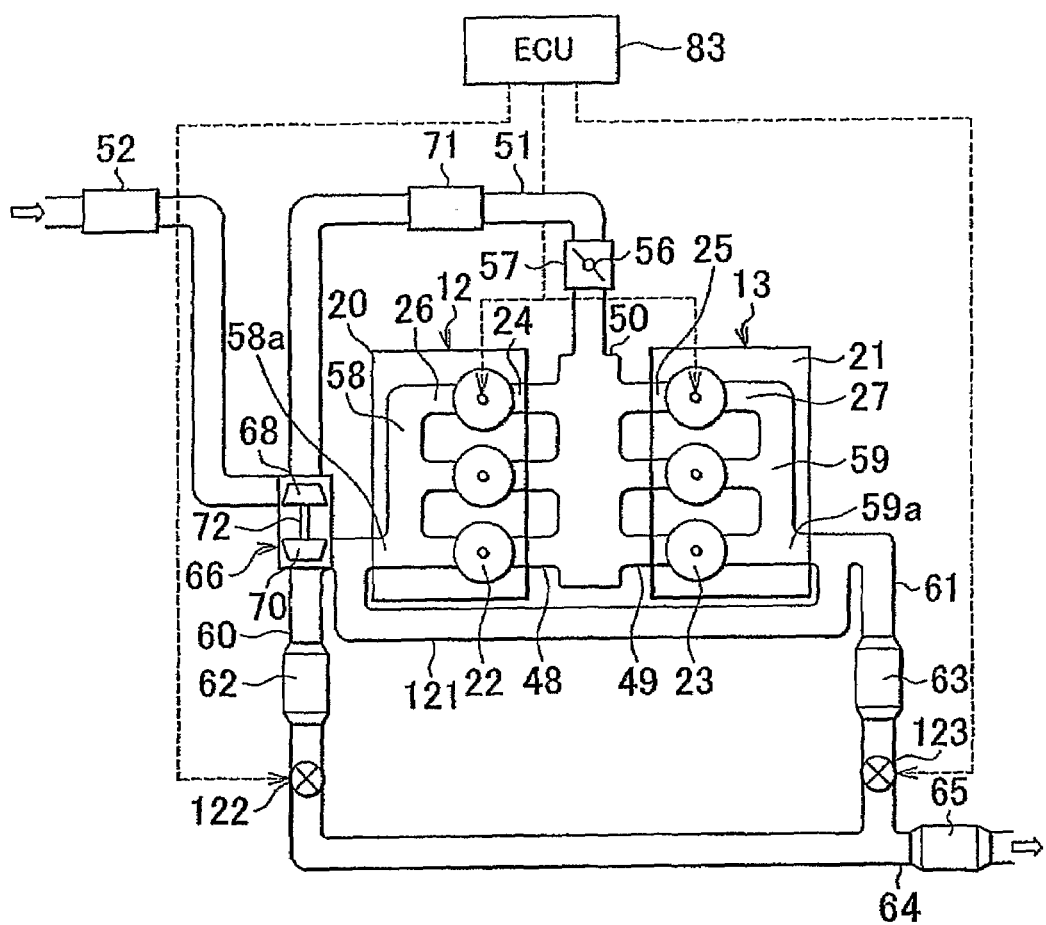
FIG. 14 is a schematic plan view of a V-type six-cylinder engine as an internal combustion engine according to a fourth embodiment of the invention.
Figure 15:
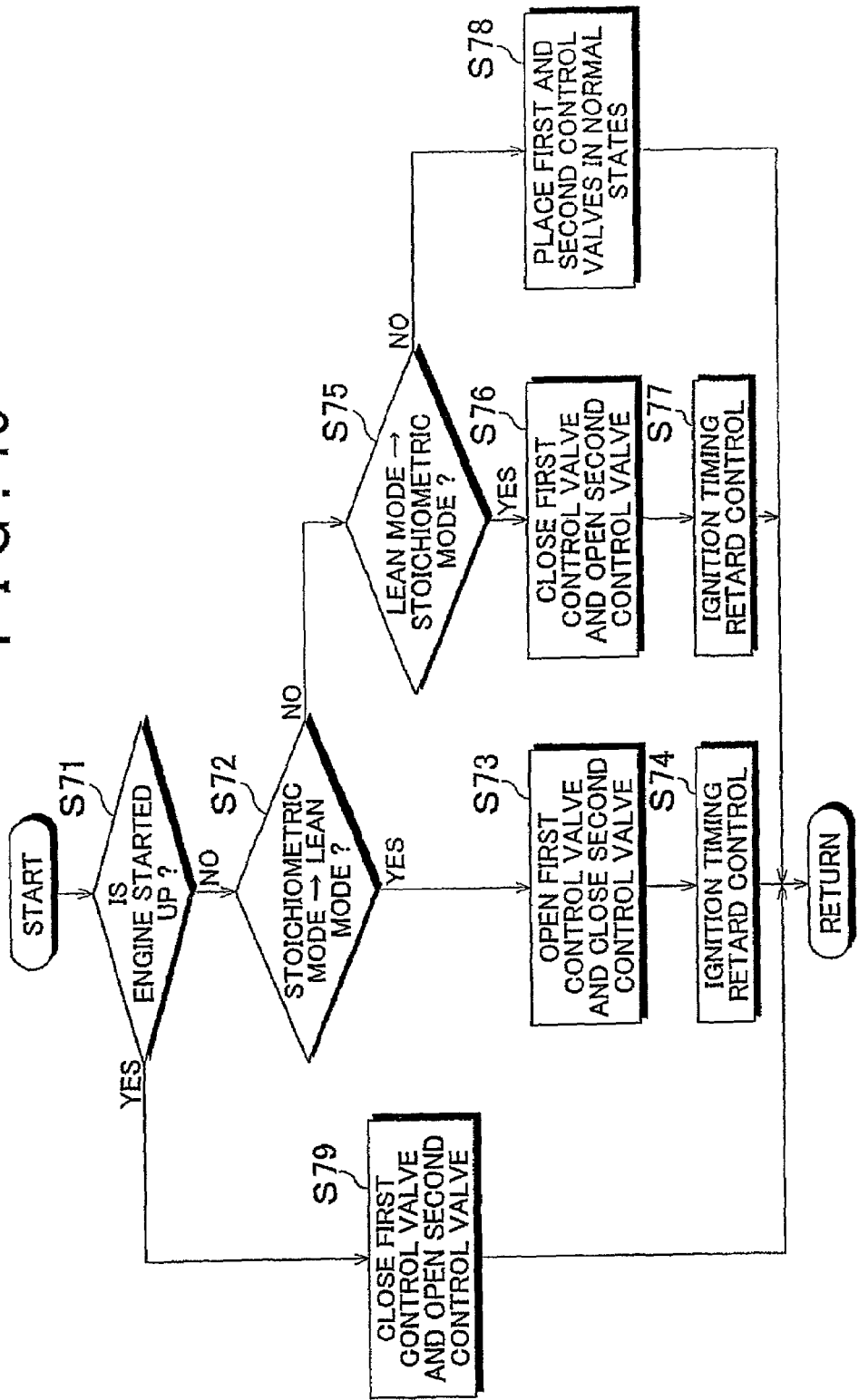
FIG. 15 is a flowchart illustrating a routine of combustion mode switching control performed on the V-type six-cylinder engine of the fourth embodiment.
Figure 16:
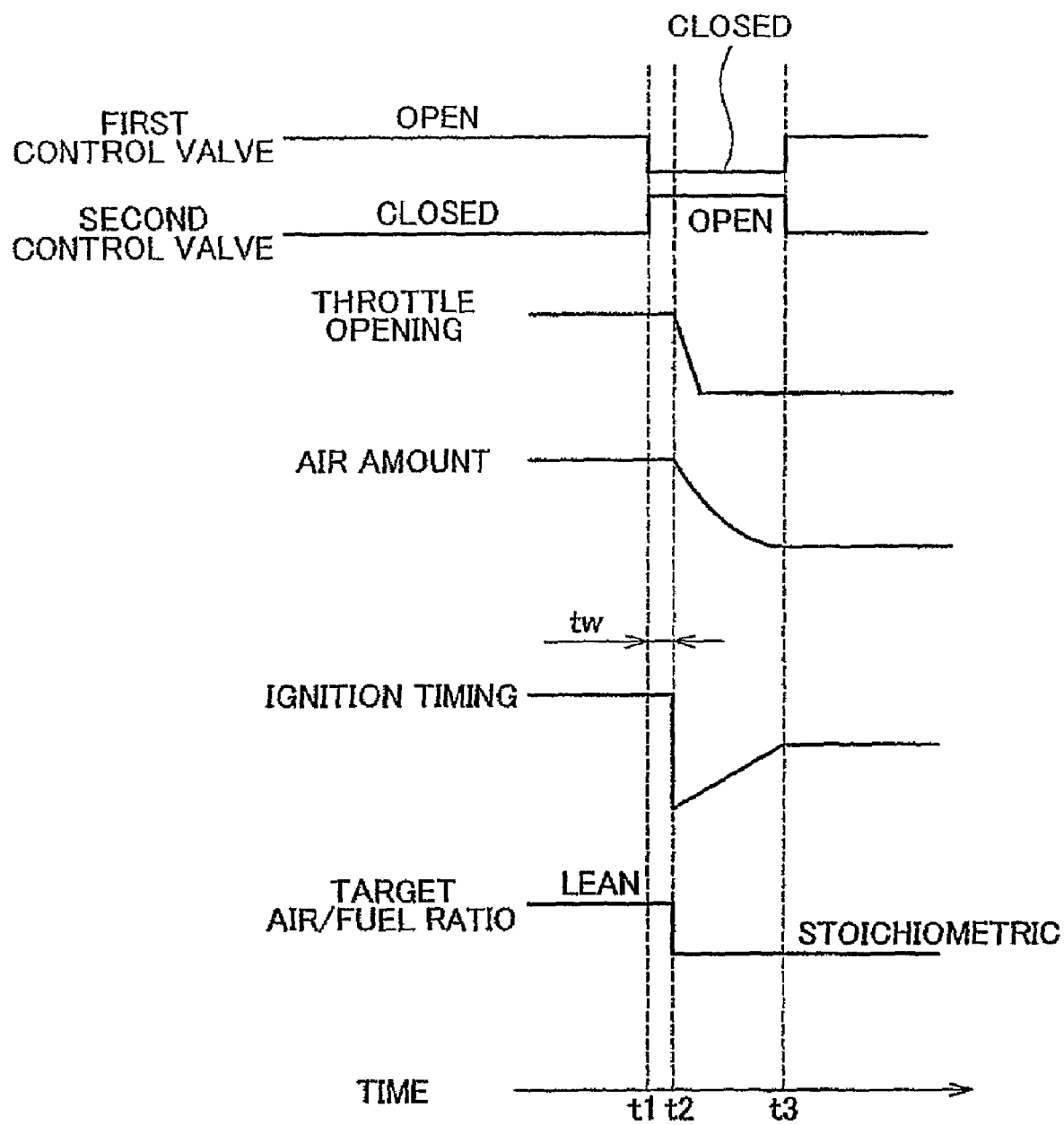
FIG. 16 is a time chart showing transitions in the engine operating conditions during switching of the combustion mode in the V-type six-cylinder engine of the fourth embodiment.

FIG. 14 is a schematic plan view of a V-type six-cylinder engine as an internal combustion engine according to a fourth embodiment of the invention, and FIG. 15 is a flowchart illustrating a routine of combustion mode switching control performed on the V-type six-cylinder engine of the fourth embodiment. FIG. 16 is a time chart showing transitions in the engine operating conditions during switching of the combustion mode in the V-type six-cylinder engine of the fourth embodiment. In FIG. 14, the same reference numerals as used in the previous embodiments will be used for identifying the same or functionally corresponding elements or members, of which no further explanation will be provided.

As shown in FIG. 14, the V-type six-cylinder engine of the present embodiment has left and right banks 12, 13 located in its upper portion such that each of the banks 12, 13 is inclined a certain angle relative to the vertical direction of the engine, and a plurality of cylinders are disposed in each of the banks 12, 13 so as to provide two cylinder groups for the respective banks 12, 13. Intake ports 24, 25 and exhaust ports 26, 27 are formed above respective combustion chambers 22, 23 of the first and second banks 12, 13 such that the intake ports 24, 25 are opposed to the exhaust ports 26, 27, and a surge tank 50 is connected to the intake ports 24, 25 via corresponding intake manifolds 48, 49. On the other hand, an air cleaner 52 is mounted in an air inlet of an intake pipe (intake passage) 51, and an electronic throttle device 57 having a throttle valve 56 is disposed in a portion of the intake pipe 51 downstream of the air cleaner 52. The intake pipe 51 is connected at its downstream end to the surge tank 50.

The exhaust ports 26, 27 communicate with collection passages 58, 59 into which exhaust gases emitted from the respective combustion chambers 22, 23 are collected, and first and second exhaust pipes 60, 61 are respectively connected to the collection passages 58, 59 via corresponding exhaust pipe connecting portions 58a, 59a. A first upstream three-way catalyst 62 is mounted in the first exhaust pipe 60 while a second upstream three-way catalyst 63 is mounted in the second exhaust pipe 61, and a NOx storage-reduction type catalyst 65 is mounted in an exhaust collection pipe 64 to which the first and second exhaust pipes 60, 61 are joined together to be connected.

A communication pipe 121 is connected to upstream portions of the first exhaust pipe 60 and second exhaust pipe 61 which are located upstream of the positions at which the upstream three-way catalysts 62, 63 are mounted as viewed in the direction of flow of the exhaust gas, so that the first exhaust pipe 60 and the second exhaust pipe 61 communicate with each other via the communication pipe 121. First control valve 122 and second control valve 123 are mounted in the first exhaust pipe 60 and the second exhaust pipe 61, respectively, at their positions downstream of the upstream three-way catalysts 62, 63 as viewed in the direction of flow of the exhaust gas. The first and second control valves 122, 123 are flow control valves, and the flow rate or amount of exhaust gas flowing through each of the exhaust pipes 60, 61 can be controlled by controlling the degree of opening of the corresponding control valve 122, 123.

A turbo-supercharger (hereinafter simply referred to as "turbocharger") 66 is provided on the side of the first bank 12. The turbocharger 66 consists principally of a compressor 68 disposed in the intake pipe 61, a turbine 70 disposed in the first exhaust pipe 60, and a coupling shaft 72 that integrally couples the compressor 68 with the turbine 70. In this case, the turbine 70 of the turbocharger 66 can be driven by exhaust gas flowing through the first exhaust pipe 60 located on the side of the first bank 12, and one end portion of the communication pipe 121 is connected to a portion of the first exhaust pipe 60 which is located upstream of the position where the turbine 70 is mounted. An intercooler 74 is disposed in a portion of the intake pipe 51 which is located downstream of the compressor 68 of the turbocharger 66 and upstream of the electronic throttle device 57 (or throttle valve 56).

With the above arrangement, the turbocharger 66 provided on the side of the first bank 12 is able to compress air flowing in the intake pipe 51, by causing the turbine 70 to be driven by the exhaust gas emitted from the combustion chambers 22 of the first bank 12 to the first exhaust pipe 60 via the exhaust ports 26 and collection passage 58, and causing the turbine 70 to drive the compressor 68 coupled to the turbine 70 with the coupling shaft 72. Thus, air introduced into the intake pipe 51 through the air cleaner 52 is fed to the surge tank 50 after being compressed by the turbocharger 66 and cooled by the intercooler 74, and is then drawn by suction into the combustion chambers 22, 23 via the respective intake manifolds 48, 49 and intake ports 24, 25 of the first and second banks 12, 13.

In the V-type six-cylinder engine of the fourth embodiment, the first and second upstream three-way catalysts 62, 63 and the first and second control valves 122, 123 are mounted in the first exhaust pipe 60 and the second exhaust pipe 61, respectively, and the first and second exhaust pipes 60, 61 communicate with each other via the communication pipe 121 at the upstream sides of the respective upstream three-way catalysts 62, 63, as described above. With the engine thus constructed, the ECU 83 is able to perform various bank controls by changing the combustion states in the respective banks 12, 13 and discharge paths through which the exhaust gases emitted from the respective banks 12, 13 are discharged.

When the engine is started at low temperatures, for example, the first control valve 122 is placed in the closed state while the second control valve 123 is placed in the open state, so that the exhaust gas discharged from the cylinder group of the first bank 12 into the first exhaust pipe 60 is caused to flow into the second exhaust pipe 61 through the communication pipe 121, and the exhaust gas streams from the cylinder groups of the first and second banks 12, 13 merge into a single stream in the second exhaust pipe 61. By causing a large amount of exhaust gas to flow into the second upstream three-way catalyst 63 in this manner, it is possible to warm up the second upstream three-way catalyst 63. Thereafter, if the warm-up of the second upstream three-way catalyst 63 is completed and the catalyst 63 is activated, the first control valve 122 is placed in the open state while the second control valve 123 is placed in the closed state, so that the exhaust gas discharged from the cylinder group of the second bank 13 into the second exhaust pipe 61 is caused to flow into the first exhaust pipe 60 through the communication pipe 121, and the exhaust gas streams from the cylinder groups of the first and second banks 12, 13 merge into a single stream in the first exhaust pipe 60. By causing a large amount of exhaust gas to flow into the first upstream three-way catalyst 62 in this manner, it is possible to warm up the first upstream three-way catalyst 62.

When the engine is operated at a high load, for example, the first control valve 122 is placed in the open state while the second control valve 123 is placed in the closed state, so that the exhaust gas discharged from the cylinder group of the second bank 13 into the second exhaust pipe 61 is caused to flow into the first exhaust pipe 60 through the communication pipe 121, and the exhaust gas streams from the cylinder groups of the first and second banks 12, 13 merge into a single stream in the first exhaust pipe 60. By causing a large amount of exhaust gas to flow into the turbocharger 66 located in the first exhaust pipe 66 in this manner, it is possible to operate the turbocharger 66 at high efficiency so as to provide a high boost pressure.

The engine may also be controlled so that the exhaust gas emitted from the cylinder group of the first bank 12 becomes a fuel-lean atmosphere (or has a lean air/fuel ratio), and the exhaust gas emitted from the cylinder group of the second bank 13 becomes a fuel-rich atmosphere (or has a rich air/fuel ratio). In this case, the first control valve 122 and the second control valve 123 are placed in the open states, and the exhaust gas as a fuel-lean atmosphere emitted from the cylinder group of the first bank 12 is caused to flow through the first exhaust pipe 60, while the exhaust gas as a fuel-rich atmosphere emitted from the cylinder group of the second bank 13 is caused to flow through the second exhaust pipe 61. The exhaust gas streams flowing through the first and second exhaust pipes 60, 61 merge into a single stream in the exhaust collection pipe 64, in which oxidation and heat generation occur in the NOx storage-reduction type catalyst 65 so as to warm up the catalyst 65, and sulfur components stored in the NOx storage-reduction type catalyst 65 are released for regeneration of the catalyst 65.

In the V-type six-cylinder engine of the fourth embodiment, the ECU 83 is able to switch the combustion mode between the lean combustion mode and the stoichiometric combustion mode, and performs the switching control using a combustion mode map in which the combustion mode is set based on the engine speed and the engine load. In this case, the ECU 83 operates the engine at the stoichiometric air/fuel ratio during switching control between the lean combustion mode and the stoichiometric combustion mode, and changes the air/fuel ratio as needed after the switching control. In the fourth embodiment, when the ECU 83 changes the combustion mode (the air/fuel ratio) from the supercharged lean combustion mode (lean air/fuel ratio) to the non-supercharged stoichiometric combustion mode (stoichiometric air/fuel ratio) while retarding the ignition timing, the first control valve 122 is closed while the second control valve 123 is opened during the combustion mode switching control (during control for changing the air/fuel ratio). In this manner, an excessive increase in the boost pressure due to an increase in the exhaust energy is prevented or suppressed during switching of the combustion mode, and the otherwise possible occurrence of a stepped change (e.g., an abrupt reduction) in torque at the time of the completion of the air/fuel ratio (combustion mode) switching control is prevented.

In the following, the combustion mode switching control performed on the V-type six-cylinder engine of the present embodiment as described above will be more specifically explained with reference to the flowchart of FIG. 15.

In the V-type six-cylinder engine of the present embodiment, the ECU 83 determines in step S71 whether the engine is being started up. If it is determined that the engine is being started up, the ECU 83 closes the first control valve 122 and opens the second control valve 123 in step S79 so as to perform warm-up control for the second upstream three-way catalyst 63 when the engine is started at a low temperature, as described above.

If, on the other hand, it is determined in step S71 that the engine is not being started up, the ECU 83 determines in step S72 whether a request for switching from the non-supercharged stoichiometric combustion mode to the supercharged lean combustion mode has been made. If it is determined that the request for switching from the non-supercharged stoichiometric combustion mode to the supercharged lean combustion mode has been made, the ECU 83 opens the first control valve 122 and closes the second control valve 123 in step S73, and performs ignition timing retard control in step S74.

If it is determined in step S72 that no request for switching from the non-supercharged stoichiometric combustion mode to the supercharged lean combustion mode has been made, it is then determined in step S75 whether a request for switching from the supercharged lean combustion mode to the non-supercharged stoichiometric combustion mode has been made. If it is determined in step S75 that the request for switching from the supercharged lean combustion mode to the non-supercharged stoichiometric combustion mode has been made, the ECU 83 closes the first control valve 122 and opens the second control valve 123 in step S76, and performs ignition timing retard control in step S77.

In this case, while the ECU 83 reduces the intake air amount so as to establish the stoichiometric air/fuel ratio during the control for switching from the supercharged lean combustion mode to the non-supercharged stoichiometric combustion mode, the exhaust temperature rises and the boost pressure increases due to retardation of the ignition timing. Therefore, the ECU 83 closes the first control valve 122 and opens the second control valve 123 in step S76 during the combustion mode switching control. With this control, the exhaust gas discharged from the cylinder group of the first bank 12 into the first exhaust pipe 60 moves into the second exhaust pipe 61 through the communication pipe 121, so that the exhaust gas emitted from all of the cylinders of the engine is discharged from the second exhaust pipe 61 without passing the turbine 70 of the turbocharger 66, and therefore, the boost pressure is prevented from increasing due to an otherwise possible increase in the rotational speed of the turbine 70.

If it is determined in step S75 that no request for switching from the supercharged lean combustion mode to the non-supercharged stoichiometric combustion mode has been made, the ECU 83 controls opening/closing of the first and second control valves 122, 123 in accordance with the engine operating conditions in step S78, so as to perform bank control.

In the following, transitions in the engine operating conditions under the combustion mode switching control in the V-type six-cylinder engine of the present embodiment will be specifically explained with reference to the time chart of FIG. 16.

In the V-type six-cylinder engine of the present embodiment, if a request for switching from the supercharged lean combustion mode to the non-supercharged stoichiometric combustion mode is made at time t1, the first control valve 122 is closed, and the second control valve 123 is opened, as shown in FIG. 16. After a lapse of a predetermined time tw, the ECU 83 reduces the throttle opening so as to reduce the intake air amount and change the air/fuel ratio to the stoichiometric air/fuel ratio, and immediately retards the ignition timing and then gradually advances the ignition timing. Namely, in view of delays in response of the first control valve 122 and second control valve 123, the ECU 83 executes the combustion mode switching control after the opening/closing actions of the first and second control valves 122, 123 are completed.

With the first control valve 122 thus closed, the exhaust gas discharged from the cylinder group of the first bank 12 into the first exhaust pipe 60 moves into the second exhaust pipe 61 through the communication pipe 121, and is discharged from the second exhaust pipe 61 without passing the turbine 70 of the turbocharger 66. Therefore, increases in the exhaust gas temperature, turbine speed and the boost pressure are restricted or avoided, and an increase in the intake air amount is also restricted or avoided. If the combustion mode switching control is finished at time t3, the ignition timing is set to the timing suitable for the engine operating conditions, and the first control valve 122 is opened while the second control valve 123 is closed. In this manner, the control for switching the combustion mode from the supercharged lean combustion mode to the non-supercharged stoichiometric combustion mode is completed.

In the explanation of the combustion mode switching control referring to the flowchart of FIG. 15, if it is determined in step S71 that the engine is being started up, the ECU 83 closes the first control valve 122 and opens the second control valve 123 in step S79, so as to perform warm-up control for the second upstream three-way catalyst 63. However, if the second upstream three-way catalyst 63 has been warmed up and is activated, and a request for switching from the non-supercharged stoichiometric combustion mode to the supercharged lean combustion mode has been made, the ECU 83 may open the first control valve 122 and close the second control valve 123, so as to cause the turbocharger 66 to increase the boost pressure and thus reduce the period of time required for accomplishing the combustion mode switching control.

In the internal combustion engine of the fourth embodiment as described above, a plurality of cylinders are divided into two groups or sets of cylinders arranged in the left and right banks, i.e., the first bank 12 and the second bank 13, and the first exhaust pipe 60 and the second exhaust pipe 61 are connected to the respective cylinder groups of the first and second banks 12, 13. Also, the first control valve 122 and the second control valve 123 are disposed in the first and second exhaust pipes 60, 61, respectively, and the communication pipe 121 communicates portions of the exhaust pipes 60, 61 upstream of the control valves 122, 123 with each other, while the turbocharger 66 is provided only on the side of the first bank 12. The ECU 83 is able to switch the combustion mode from the supercharged lean combustion mode to the non-supercharged stoichiometric combustion mode, depending on the engine operating conditions. During the combustion mode switching control, the ECU 83 retards the ignition timing, and closes the first control valve 122 while opening the second control valve 123.

With the above arrangement, when the combustion mode is switched from the supercharged lean combustion mode to the non-supercharged stoichiometric combustion mode, the ignition timing is retarded so as to prevent torque from increasing to be larger than, necessary. Also, the first control valve 122 is closed while the second control valve 123 is opened, so that the exhaust gas is discharged without passing the turbine 70, which makes it possible to suppress or avoid an excessive increase in the boost pressure due to retardation of the ignition timing and a resulting increase in torque, and prevent the otherwise possible occurrence of a stepped change (e.g., an abrupt reduction) in torque at the time of change of the air/fuel ratio, thus assuring improved driveability.

When switching from the supercharged lean combustion mode to the non-supercharged stoichiometric combustion mode, the ECU 83 changes the air/fuel ratio after a lapse of the predetermined time tw from the opening or closing of the first control valve 122 and second control valve 123. Namely, in view of delays in response of the first control valve 122 and the second control valve 123, the combustion mode switching control is executed after the completion of the opening/closing actions of the respective control valves 122, 123, so that an excessive increase in the boost pressure can be appropriately prevented.

Also, in the present embodiment, when the ECU 83 changes the combustion mode from the non-supercharged stoichiometric combustion mode to the supercharged lean combustion mode while retarding the ignition timing during start-up of the engine with the catalyst(s) warmed up, the first control valve 122 is opened while the second control valve 123 is closed during the combustion mode switching control, so that the turbocharger 66 can raise the boost pressure to a desired level in a short period time, and the time required for accomplishing the combustion mode switching control can be reduced.

While the V-type six-cylinder engine is employed as the internal combustion engine in each of the illustrated embodiments, it is to be understood that the type of the engine and the number of cylinders are not limited to those of the illustrated embodiments, and that the invention is equally applicable to any type of engine.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. An internal combustion engine including a supercharger capable of compressing intake air and feeding the compressed intake air into a combustion chamber, boost pressure detecting means for detecting the boost pressure, air/fuel ratio changing means for changing the air/fuel ratio, ignition timing changing means for changing the ignition timing, and control means for causing the ignition timing changing means to retard the ignition timing when the air/fuel ratio changing means changes the air/fuel ratio from a stoichiometric air/fuel ratio to a lean air/fuel ratio, wherein:

when the control means changes the air/fuel ratio from the stoichiometric air/fuel ratio to the lean air/fuel ratio while retarding the ignition timing, the control means keeps the retard amount of the ignition timing at a constant value if the boost pressure detected by the boost pressure detecting means becomes equal to or higher than a target boost pressure that is set in advance depending on operating conditions of the engine.

2. An internal combustion engine including a plurality of cylinders that are divided into first and second cylinder groups that are arranged in left and right banks, respectively, first and second exhaust passages provided independently for the first and second cylinder groups, first and second control valves disposed in the first and second exhaust passages, respectively, for controlling the amount of flow of exhaust gas in the corresponding exhaust passages, first and second purifying catalysts disposed in the first and second exhaust passages, respectively, a communication passage through which a portion of the first exhaust passage upstream of the first control valve and the first purifying catalyst communicates with a portion of the second exhaust passage upstream of the second control valve and the second purifying catalyst, a supercharger provided only for the first cylinder group, air/fuel ratio changing means for changing the air/fuel ratio, ignition timing changing means for changing the ignition timing, and control means for causing the ignition timing changing means to retard the ignition timing when the air/fuel ratio changing means changes the air/fuel ratio between a lean air/fuel ratio and a stoichiometric air/fuel ratio, wherein:

when the control means changes the air/fuel ratio from the lean air/fuel ratio to the stoichiometric air/fuel ratio while retarding the ignition timing, the control means closes the first control valve and opens the second control valve during control for changing the air/fuel ratio.

3. An internal combustion engine comprising:

a supercharger capable of compressing intake air and feeding the compressed intake air into a combustion chamber;

a boost pressure detector that detects a boost pressure;

an air/fuel ratio changing unit that changes an air/fuel ratio;

an ignition timing changing unit that changes the ignition timing; and a controller that causes the ignition timing changing unit to retard the ignition timing when the air/fuel ratio changing unit changes the air/fuel ratio from a stoichiometric air/fuel ratio to a lean air/fuel ratio, wherein when the controller changes the air/fuel ratio from the stoichiometric air/fuel ratio to the lean air/fuel ratio while retarding the ignition timing, the controller keeps a retard amount of the ignition timing at a constant value if the boost pressure detected by the boost pressure detector becomes equal to or higher than a target boost pressure that is set in advance depending on operating conditions of the engine.

4. The internal combustion engine according to claim 3, wherein the target boost pressure is set to a value that is lower by a predetermined amount than a required boost pressure that is set based on the operating conditions of the engine so that the boost pressure reaches the required boost pressure when the lean air/fuel ratio is established.

5. The internal combustion engine according to claim 3, wherein:

an air amount detector is further provided for detecting the amount of air drawn into the combustion chamber; and when the controller changes the air/fuel ratio from the stoichiometric air/fuel ratio to the lean air/fuel ratio while retarding the ignition timing, the controller keeps the retard amount of the ignition timing at a constant value if the boost pressure becomes equal to or higher than the target boost pressure, and controls the throttle opening so that the air amount detected by the air amount detector becomes substantially equal to a target air amount that is set in advance depending on the operating conditions of the engine.

6. The internal combustion engine according to claim 4, wherein:
an air amount detector is further provided for detecting the amount of air drawn into the combustion chamber; and
when the controller changes the air/fuel ratio from the stoichiometric air/fuel ratio to the lean air/fuel ratio while retarding the ignition timing, the controller keeps the retard amount of the ignition timing at a constant value if the boost pressure becomes equal to or higher than the target boost pressure, and controls the throttle opening so that the air amount detected by the air amount detector becomes substantially equal to a target air amount that is set in advance depending on the operating conditions of the engine.

7. An internal combustion engine comprising:
a plurality of cylinders that are divided into first and second cylinder groups that are arranged in left and right banks, respectively;
first and second exhaust passages provided independently for the first and second cylinder groups;
first and second control valves disposed in the first and second exhaust passages, respectively, for controlling the amount of flow of exhaust gas in the corresponding exhaust passages;
first and second purifying catalysts disposed in the first and second exhaust passages, respectively;
a communication passage through which a portion of the first exhaust passage upstream of the first control valve and the first purifying catalyst communicates with a portion of the second exhaust passage upstream of the second control valve and the second purifying catalyst;
a supercharger provided only for the first cylinder group;
an air/fuel ratio changing unit that changes an air/fuel ratio;
an ignition timing changing unit that changes the ignition timing; and
a controller that causes the ignition timing changing unit to retard the ignition timing when the air/fuel ratio changing unit changes the air/fuel ratio between a lean air/fuel ratio and a stoichiometric air/fuel ratio, wherein
when the controller changes the air/fuel ratio from the lean air/fuel ratio to the stoichiometric air/fuel ratio while retarding the ignition timing, the controller closes the first control valve and opens the second control valve during control for changing the air/fuel ratio.

8. The internal combustion engine according to claim 7, wherein the controller changes the air/fuel ratio from the stoichiometric air/fuel ratio to the lean air/fuel ratio while retarding the ignition timing during start-up of the engine with the purifying, catalysts warmed up, and the controller opens the first control valve and closes the second control valve during the control for changing the air/fuel ratio.

9. The internal combustion engine according to claim 7, wherein the controller causes the air/fuel ratio changing means to change the air/fuel ratio from the lean air/fuel ratio to the stoichiometric air/fuel ratio, after a lapse of a predetermined time from opening or closing of the first control valve and the second control valve.

10. A method for controlling an internal combustion engine that includes: a supercharger capable of compressing intake air and feeding the compressed intake air into a combustion chamber; a boost pressure detector that detects a boost pressure; an air/fuel ratio changing unit that changes an air/fuel ratio; and an ignition timing changing unit that changes the ignition timing,
the method comprising:
causing the ignition timing changing unit to retard the ignition timing when the air/fuel ratio changing unit changes the air/fuel ratio from a stoichiometric air/fuel ratio to a lean air/fuel ratio; and
keeping a retard amount of the ignition timing at a constant value if the boost pressure detected by the boost pressure detector becomes equal to or higher than a target boost pressure that is set in advance depending on operating conditions of the engine, when the air/fuel ratio is changed from the stoichiometric air/fuel ratio to the lean air/fuel ratio while retarding the ignition timing.

11. A method for controlling an internal combustion engine that includes:
a plurality of cylinders that are divided into first and second cylinder groups that are arranged in left and right banks, respectively; first and second exhaust passages provided independently for the first and second cylinder groups; first and second control valves disposed in the first and second exhaust passages, respectively, for controlling the amount of flow of exhaust gas in the corresponding exhaust passages; first and second purifying catalysts disposed in the first and second exhaust passages, respectively; a communication passage through which a portion of the first exhaust passage upstream of the first control valve and the first purifying catalyst communicates with a portion of the second exhaust passage upstream of the second control valve and the second purifying catalyst; a supercharger provided only for the first cylinder group; an air/fuel ratio changing unit that changes an air/fuel ratio; an ignition timing changing unit that changes the ignition timing,
the method comprising:
causing the ignition timing changing unit to retard the ignition timing when the air/fuel ratio changing unit changes the air/fuel ratio between a lean air/fuel ratio and a stoichiometric air/fuel ratio; and
closing the first control valve and opening the second control valve during control for changing the air/fuel ratio, when the air/fuel ratio is changed from the lean air/fuel ratio to the stoichiometric air/fuel ratio while retarding the ignition timing.

* * * * *